US010897597B1

(12) United States Patent
Sturges

(10) Patent No.: US 10,897,597 B1
(45) Date of Patent: *Jan. 19, 2021

(54) INBOUND CALLS TO CONTROLLED-ENVIRONMENT FACILITY RESIDENT TELEPHONE NUMBERS

(71) Applicant: Securus Technologies, Inc., Carrollton, TX (US)

(72) Inventor: James Sturges, Dallas, TX (US)

(73) Assignee: Securus Technologies, LLC, Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/688,570

(22) Filed: Nov. 19, 2019

Related U.S. Application Data

(63) Continuation of application No. 16/361,171, filed on Mar. 21, 2019, now Pat. No. 10,484,648.

(51) Int. Cl.
| | | |
|---|---|---|
| *H04N 7/14* | (2006.01) | |
| *H04M 15/00* | (2006.01) | |
| *H04L 29/06* | (2006.01) | |
| *H04M 3/493* | (2006.01) | |
| *H04M 3/42* | (2006.01) | |

(52) U.S. Cl.
CPC ......... *H04N 7/147* (2013.01); *H04L 65/1006* (2013.01); *H04L 65/1096* (2013.01); *H04M 3/42059* (2013.01); *H04M 3/42374* (2013.01); *H04M 3/4931* (2013.01); *H04M 15/887* (2013.01)

(58) Field of Classification Search
CPC ....................................................... H04N 7/14
See application file for complete search history.

(56) References Cited

U.S. PATENT DOCUMENTS

| | | |
|---|---|---|
| 5,926,533 A | 7/1999 | Gainsboro |
| 6,611,583 B1 | 8/2003 | Gainsboro |
| 6,665,380 B1 | 12/2003 | Cree et al. |

(Continued)

OTHER PUBLICATIONS

Exhibit 24, Screening Out Family Time: The For-Profit Video Visitation Industry in Prisons and Jails, Portsmouth County, Virginia Home WAV Contract and Brochure, Jun. 6, 2012, 7 Pages.

*Primary Examiner* — Olisa Anwah
(74) *Attorney, Agent, or Firm* — Fogarty LLP

(57) ABSTRACT

Systems and methods enabling inbound calls to controlled-environment facility resident telephone numbers employ resident-associated communications devices deployed in the facilities. An inbound and outbound calling platform assigns a telephone number to each resident and associates a routable (IP) address of each resident communications device with such telephone number. This calling platform also presents an online directory to accessing inbound callers that lists residents the caller is allowed to call, the telephone number(s) of such resident(s), and whether such residents and their communications devices are ready to receive a call. The calling platform reconfirms such information upon an inbound call being placed to a telephone number assigned to a resident and signals the resident communications device associated with the resident assigned that telephone number. A controlled-environment facility communication processing system routes the call to the resident communications device associated with the resident called and connects the call.

20 Claims, 8 Drawing Sheets

(56) References Cited

U.S. PATENT DOCUMENTS

| | | | |
|---|---|---|---|
| 7,058,163 B1 | 6/2006 | Parekh et al. | |
| 7,256,816 B2 | 8/2007 | Profanchik et al. | |
| 7,302,255 B1 * | 11/2007 | Lundy | H04L 29/06027 370/338 |
| 7,359,496 B2 * | 4/2008 | Qian | H04M 3/42374 379/201.07 |
| 7,496,345 B1 | 2/2009 | Rae et al. | |
| 7,697,667 B1 | 4/2010 | Wageman et al. | |
| 8,064,580 B1 | 11/2011 | Apple et al. | |
| 8,190,121 B2 | 5/2012 | Smith et al. | |
| 8,295,446 B1 | 10/2012 | Apple et al. | |
| 8,478,234 B1 | 7/2013 | Byrne | |
| 8,577,003 B2 | 11/2013 | Rae | |
| 8,582,738 B1 | 11/2013 | Keiser | |
| 8,648,894 B2 | 2/2014 | Laney et al. | |
| 8,761,353 B1 | 6/2014 | Apple et al. | |
| 8,976,949 B2 | 3/2015 | Torgersrud et al. | |
| 9,020,115 B2 | 4/2015 | Hangsleben | |
| 9,094,500 B1 | 7/2015 | Edwards | |
| 9,094,569 B1 | 7/2015 | Humphries | |
| 9,106,789 B1 | 8/2015 | Shipman, Jr. et al. | |
| 9,113,131 B1 | 8/2015 | Passe et al. | |
| 9,124,763 B2 | 9/2015 | Humphries | |
| 9,225,701 B2 | 12/2015 | Gongaware et al. | |
| 9,247,200 B2 | 1/2016 | Gupta et al. | |
| 9,282,188 B2 | 3/2016 | Hodge et al. | |
| 9,288,439 B2 | 3/2016 | Bloms et al. | |
| 9,307,386 B2 | 4/2016 | Hodge et al. | |
| 9,420,094 B1 | 8/2016 | Keiser et al. | |
| 9,473,497 B1 | 10/2016 | Smith | |
| 9,729,709 B1 | 8/2017 | Edwards et al. | |
| 9,742,910 B2 * | 8/2017 | Keiser | H04M 3/436 |
| 9,826,003 B1 | 11/2017 | Thomasson et al. | |
| 9,832,313 B1 | 11/2017 | Way et al. | |
| 9,888,108 B2 | 2/2018 | Hodge et al. | |
| 2001/0026609 A1 | 10/2001 | Weinstein et al. | |
| 2003/0046083 A1 | 3/2003 | Devinney, Jr. et al. | |
| 2003/0076940 A1 | 4/2003 | Manto | |
| 2003/0174823 A1 | 9/2003 | Justice et al. | |
| 2003/0174826 A1 | 9/2003 | Hesse | |
| 2003/0198325 A1 | 10/2003 | Bayne | |
| 2005/0265529 A1 | 12/2005 | Hogg, Jr. et al. | |
| 2006/0154662 A1 * | 7/2006 | Kil | H04L 61/2015 455/435.1 |
| 2006/0173781 A1 | 8/2006 | Donner | |
| 2006/0256940 A1 | 11/2006 | Pekarovic et al. | |
| 2007/0041517 A1 | 2/2007 | Clarke et al. | |
| 2008/0040780 A1 | 2/2008 | Reinhold | |
| 2008/0057976 A1 | 3/2008 | Rae et al. | |
| 2010/0189228 A1 | 7/2010 | Seyfetdinov | |
| 2011/0077022 A1 | 3/2011 | Scovill | |
| 2011/0317685 A1 | 12/2011 | Torgersrud et al. | |
| 2012/0262271 A1 | 10/2012 | Torgersrud et al. | |
| 2013/0023247 A1 | 1/2013 | Bolon et al. | |
| 2013/0194377 A1 | 8/2013 | Humphries | |
| 2013/0217376 A1 | 8/2013 | Behairy et al. | |
| 2013/0263227 A1 | 10/2013 | Gongaware et al. | |
| 2013/0311180 A1 | 11/2013 | Amison | |
| 2014/0080443 A1 | 3/2014 | Smith et al. | |
| 2014/0106699 A1 | 4/2014 | Chitre et al. | |
| 2014/0192132 A1 | 7/2014 | Avery et al. | |
| 2014/0218466 A1 | 8/2014 | Bloms et al. | |
| 2014/0219432 A1 | 8/2014 | Bengston et al. | |
| 2014/0267547 A1 | 9/2014 | Torgersrud et al. | |
| 2014/0287715 A1 | 9/2014 | Hodge et al. | |
| 2015/0050910 A1 | 2/2015 | Torgersrud | |
| 2015/0078541 A1 | 3/2015 | Hodge | |
| 2015/0207927 A1 | 7/2015 | Torgersrud et al. | |
| 2015/0215254 A1 | 7/2015 | Bennett | |
| 2015/0256671 A1 | 9/2015 | Torgersrud et al. | |
| 2015/0319612 A1 | 11/2015 | Hodge | |
| 2016/0007201 A1 | 1/2016 | Torgersrud et al. | |
| 2016/0066182 A1 | 3/2016 | Hodge et al. | |
| 2016/0078281 A1 | 3/2016 | Gongware et al. | |
| 2016/0088481 A1 | 3/2016 | Byrne | |
| 2016/0112424 A1 | 4/2016 | Torgersrud et al. | |
| 2016/0119580 A1 | 4/2016 | Torgersrud | |
| 2016/0191850 A1 | 6/2016 | Humphries | |
| 2016/0328894 A1 | 11/2016 | Zhang | |
| 2017/0093832 A1 | 3/2017 | Schwartz et al. | |
| 2017/0195494 A1 | 7/2017 | Bengston et al. | |
| 2017/0201623 A1 | 7/2017 | Keiser et al. | |
| 2017/0208468 A1 | 7/2017 | Hodge et al. | |
| 2017/0221287 A1 | 8/2017 | Robinson et al. | |
| 2017/0331947 A1 | 11/2017 | Hodge | |
| 2017/0346940 A1 | 11/2017 | Hodge et al. | |
| 2018/0097942 A1 | 4/2018 | Hodge | |
| 2018/0139589 A1 * | 5/2018 | Hangsleben | H04W 4/14 |
| 2018/0159972 A1 | 6/2018 | Hodge et al. | |
| 2019/0014062 A1 * | 1/2019 | Hodge | H04L 67/306 |

* cited by examiner

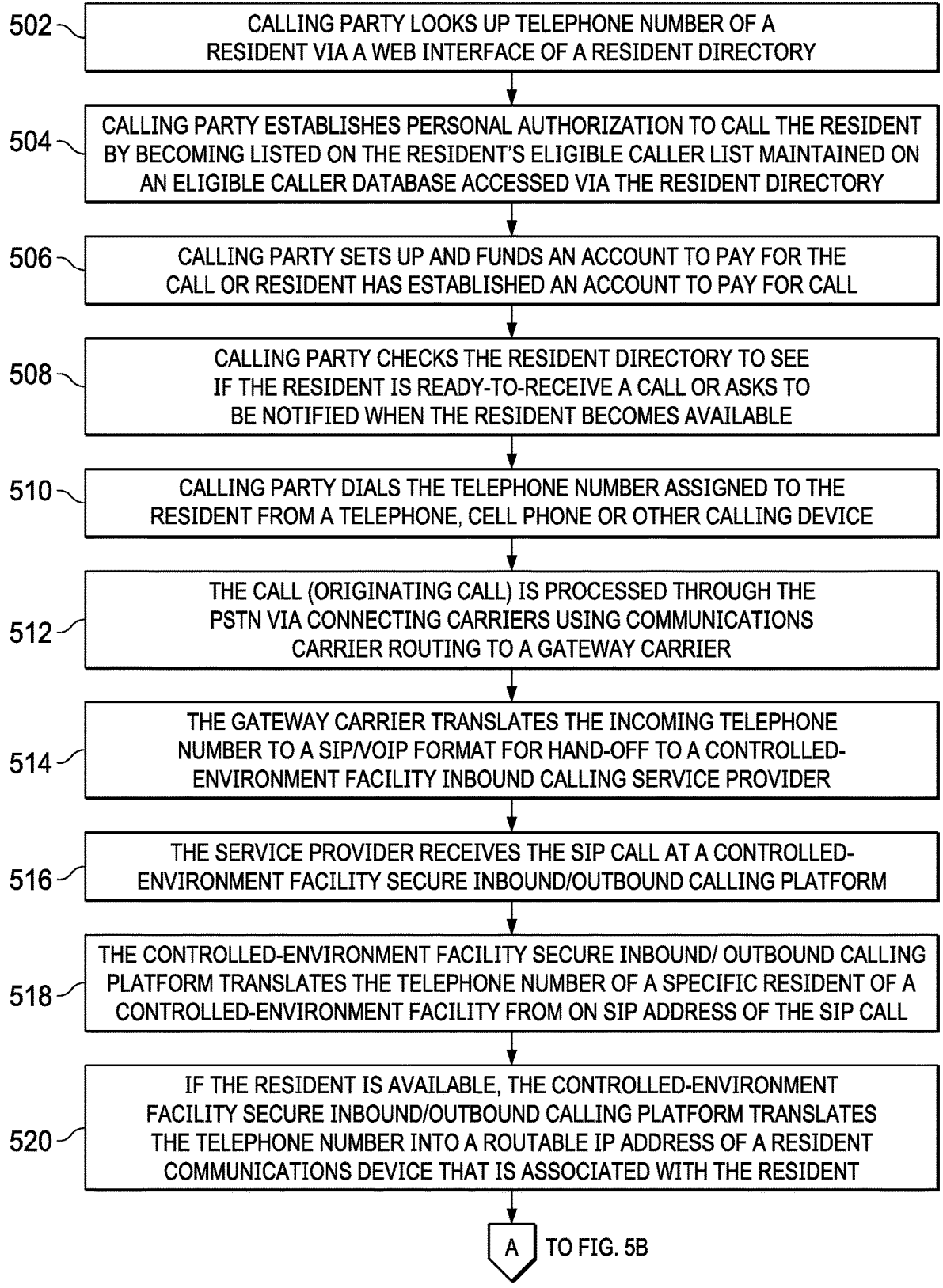

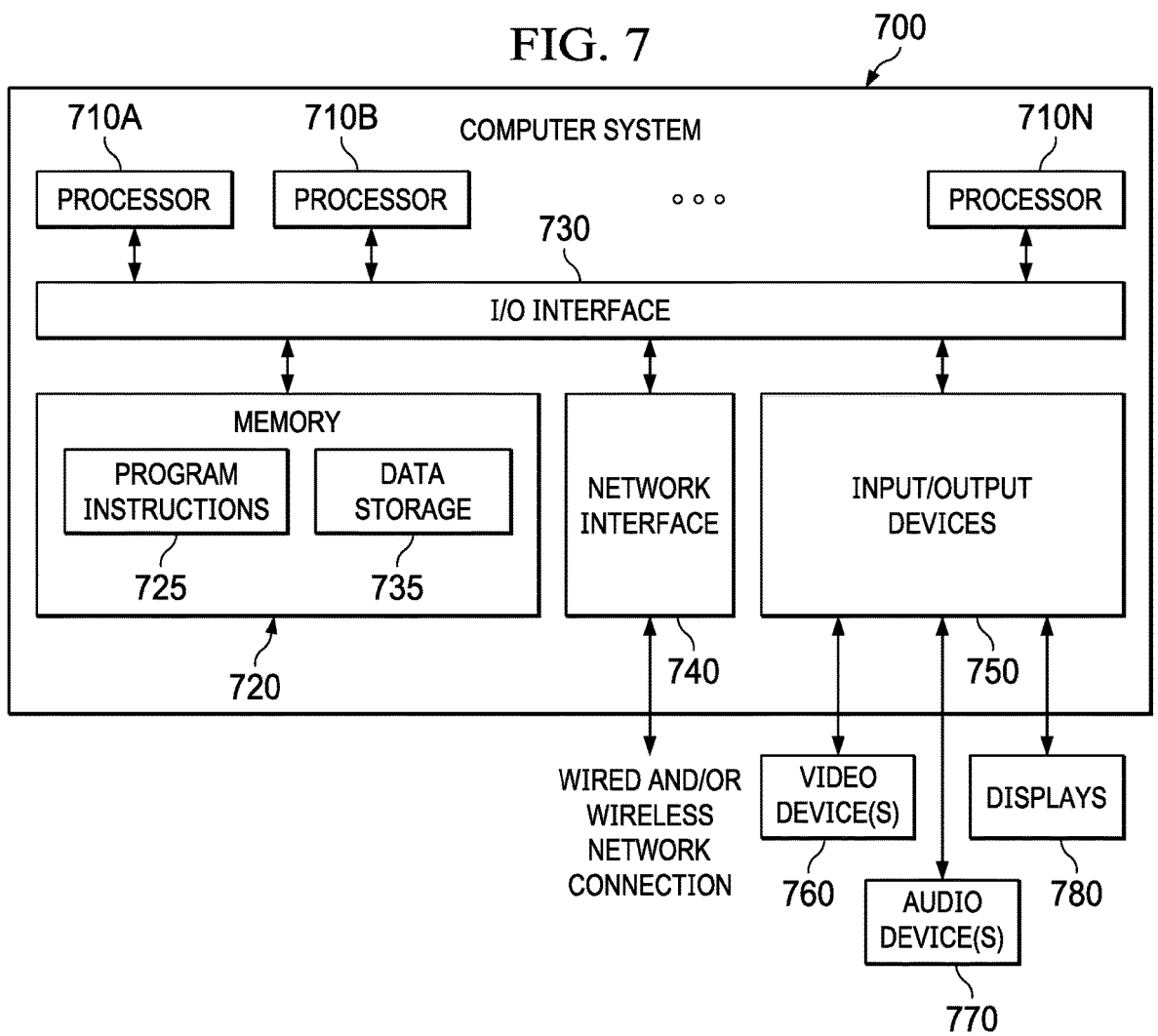

INBOUND CALLS TO CONTROLLED-ENVIRONMENT FACILITY RESIDENT TELEPHONE NUMBERS

CROSS-REFERENCE TO RELATED APPLICATION

This is a continuation of, and claims benefit of, U.S. patent application Ser. No. 16/361,171, also entitled Inbound Calls to Controlled-Environment Facility Resident Telephone Numbers, filed Mar. 21, 2019 and issued as U.S. Pat. No. 10,484,648 on Nov. 19, 2019, which is hereby incorporated herein by reference.

TECHNICAL FIELD

The present disclosure relates generally to controlled-environment facilities, more particularly to communications with residents of controlled-environment facilities, and specifically to inbound phone and video calls to controlled-environment facility resident telephone numbers assigned to controlled-environment facility resident communications devices.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences and online chat sessions.

Traditional communication services provide residents (inmates) of controlled-environment facilities (such as correctional facilities) the ability to place outbound phone calls to non-residents of the controlled-environment facility. Additionally, non-residents can typically schedule video visitation with residents (inmates) of the controlled-environment facility. Other types of communication available to con-trolled-environment residents include the ability to exchange email and canned text messages between residents and non-residents of the controlled-environment facility.

Due to security and other concerns controlled-environment facility residents do not typically have access to cell phones, and telephones which are available are shared between numerous residents. Furthermore, there is no method of incoming call handling or call screening, such as a switchboard, or the like. Hence, there is no way to direct inbound calls to a particular controlled-environment facility resident. Additionally, the times when a resident of a con-trolled-environment facility may be available to receive calls, if such were provided, may be extremely restricted and unpredictable to the outside caller.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which enable inbound voice and video calls to controlled-environment facility resident telephone numbers. Therein, resident communications devices are deployed in con-trolled-environment facilities, and each device is associated with a controlled-environment facility resident. A con-trolled-environment facility inbound and outbound calling platform, and/or the like, assigns a telephone number to each controlled-environment facility resident and associates a routable address of each resident communications device with the telephone number assigned to a controlled-environment facility resident associated with the resident communications device.

The controlled-environment facility inbound and outbound calling platform, and/or the like, also presents an online directory to accessing inbound callers. This online directory lists residents that an accessing inbound caller is allowed to call, the telephone number of residents the inbound caller is allowed to call, whether the resident communications devices and the residents the inbound caller is allowed to call are ready to receive a call, and/or the like. The controlled-environment facility inbound and outbound calling platform, and/or the like, may also present, via the online directory, whether funds are available in an account of the accessing inbound caller to call resident s listed in the online directory.

Each of the resident communications devices may have a presence application executing on the respective resident communications device. This presence application may transmit a presence event package from the respective resident communications device when ready to receive and being operated by a resident ready to receive. In such case, the controlled-environment facility inbound and outbound calling platform, and/or the like includes and/or is associated with a presence server that receives the presence event package and lists, in the online directory, the resident as a resident ready to receive calls.

The controlled-environment facility inbound and outbound calling platform, and/or the like, also identifies the inbound caller upon an inbound call being placed to a telephone number assigned to a controlled-environment facility resident, determines the inbound caller is eligible to call the resident assigned the called telephone number, determines the resident the called telephone number is assigned to and the resident communications device associated with the resident assigned the called telephone number are ready to receive the call, and/or the like. The controlled-environment facility inbound and outbound calling platform, and/or the like, may also determine if funds are available in an account of the inbound caller for the inbound call to proceed.

The controlled-environment facility inbound and outbound calling platform may include and/or be associated with a Session Initiation Protocol (SIP) application server configured to translate the called telephone number to an Internet Protocol (IP) address of the resident communications device assigned to the resident to whom the called telephone number is assigned to.

The controlled-environment facility inbound and outbound calling platform, and/or the like, may signal the resident communications device associated with the resident assigned the called telephone number, following identifying the inbound caller, determining the inbound caller is eligible to call the resident assigned the called telephone number, determining the resident and an resident communications device associated with the resident assigned the called telephone number are ready to receive the call, and/or the like.

A controlled-environment facility communication processing system then routes the call to the resident communications device associated with the resident assigned the called telephone number, receives the inbound call from the inbound calling platform, connects the call to the resident communications device associated with the resident assigned the called telephone number, etc.

The controlled-environment facility inbound and outbound calling platform may be disposed in a controlled-environment facility communications service provider call processing center, or the like, which may serve a plurality of controlled-environment facilities. The present system and methods may make use of a consolidated controlled-environment facility Administration and Management System (AMS) that is a part of, or otherwise associated with the controlled-environment facility inbound and outbound calling platform. This consolidated controlled-environment facility AMS may create and maintain Uniform Personal Identification Numbers (UPINs) and a list of thereof. Each such UPIN is assigned to a resident reachable by the controlled-environment facility inbound and outbound calling platform, regardless of in which controlled-environment facility of the plurality of controlled-environment facilities severed by the controlled-environment facility inbound and outbound calling platform the resident resides.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
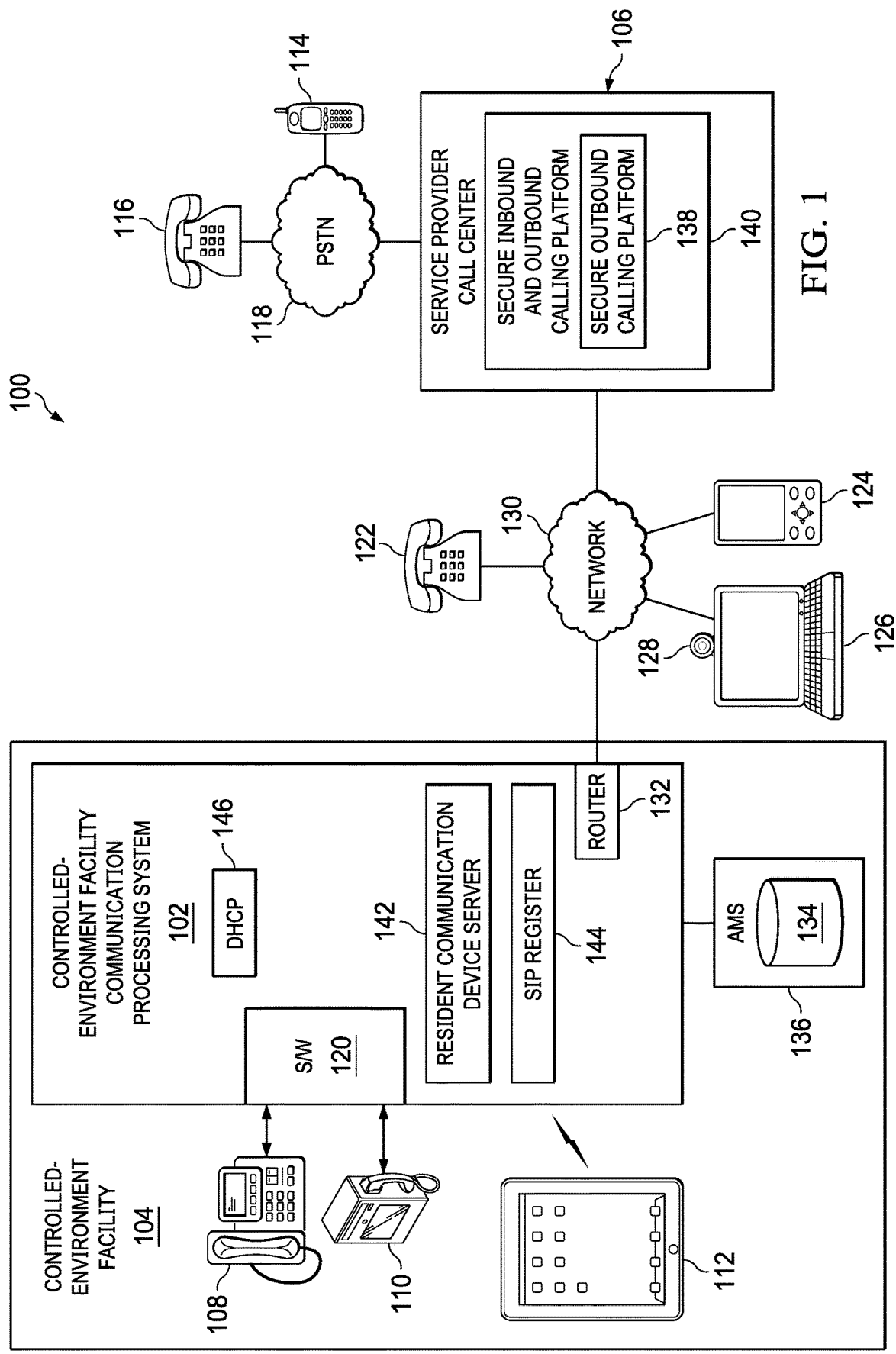
Figure 2:
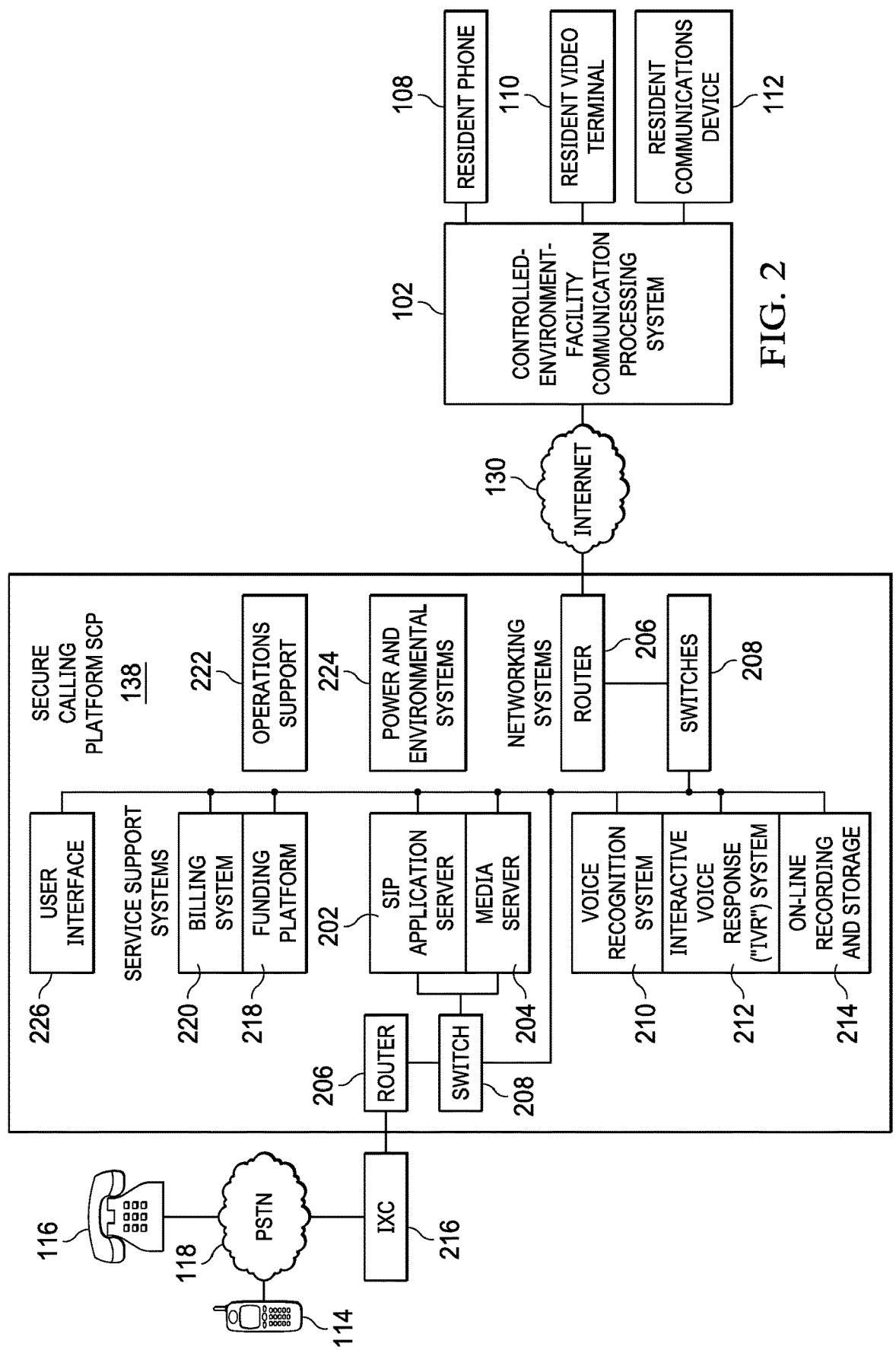
Figure 3:
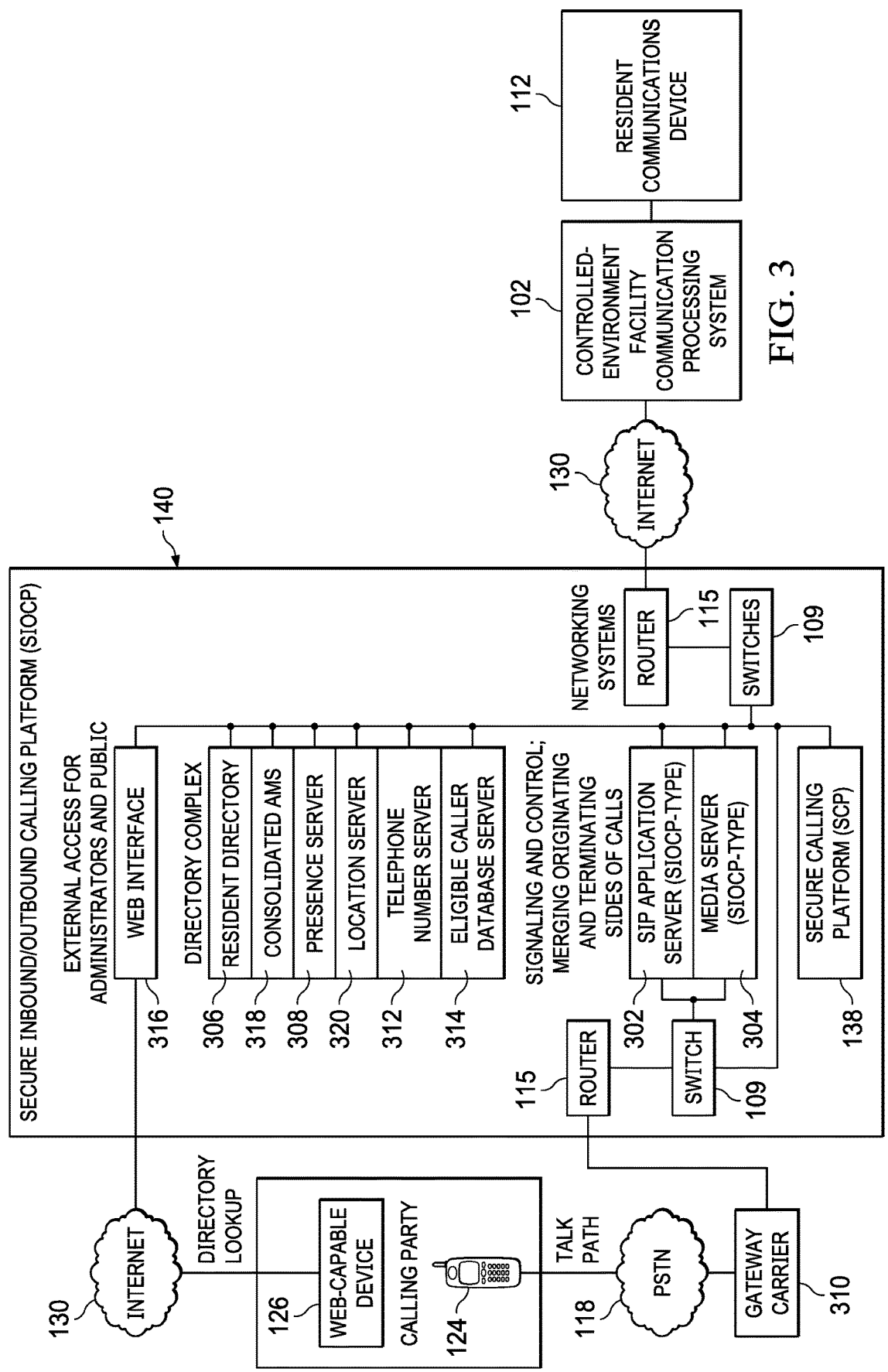
Figure 4:
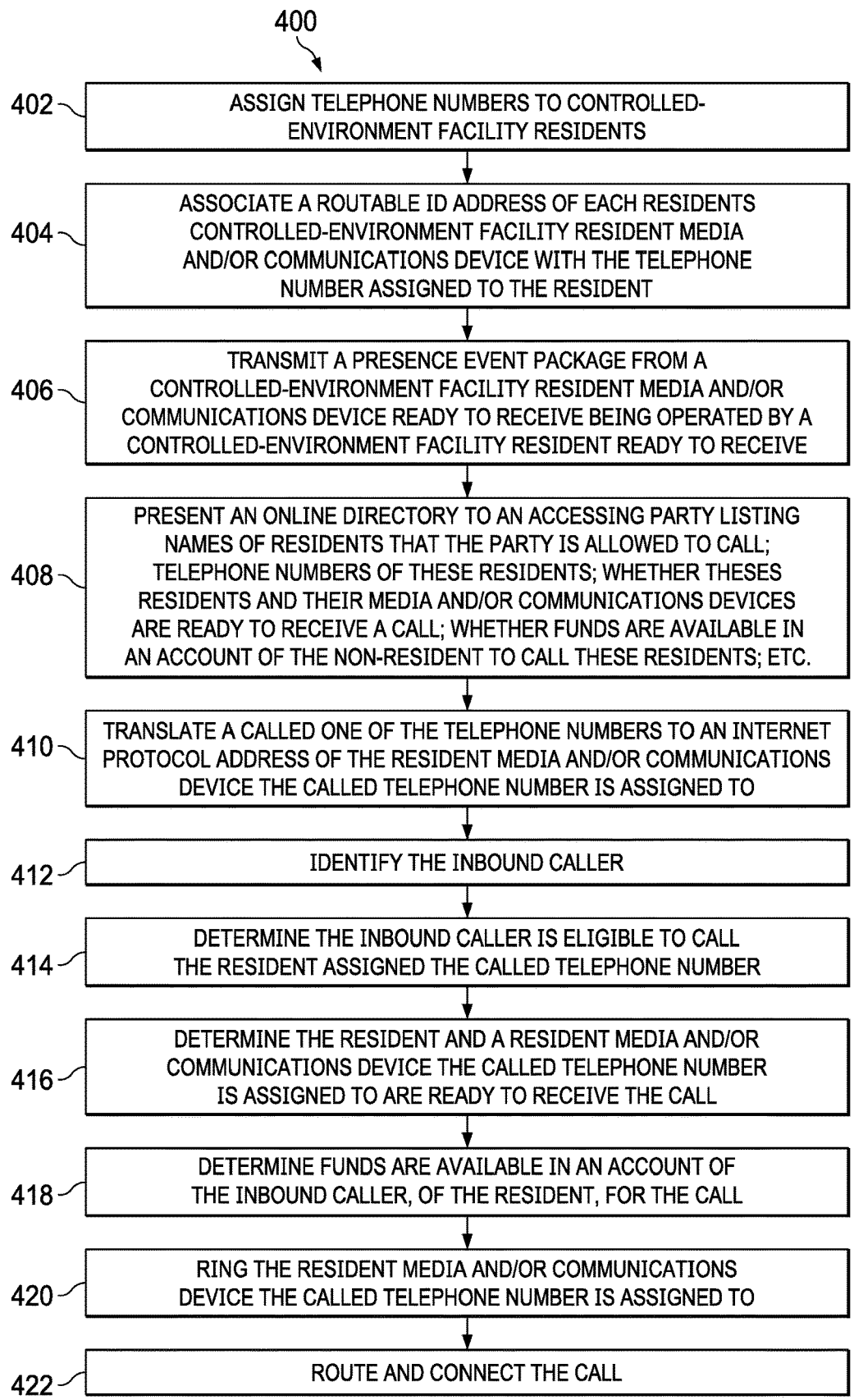
Figure 5B:
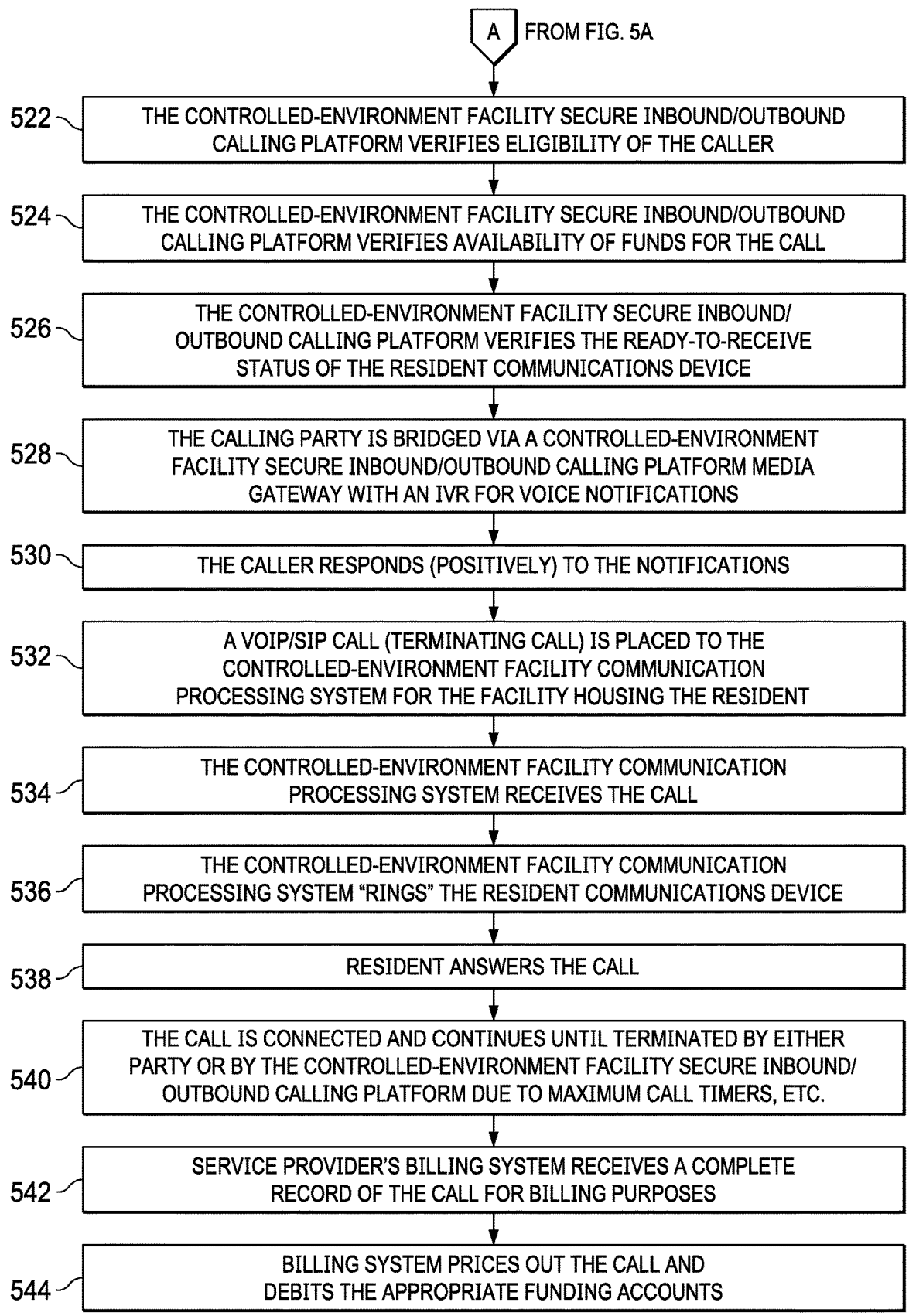
Figure 6:
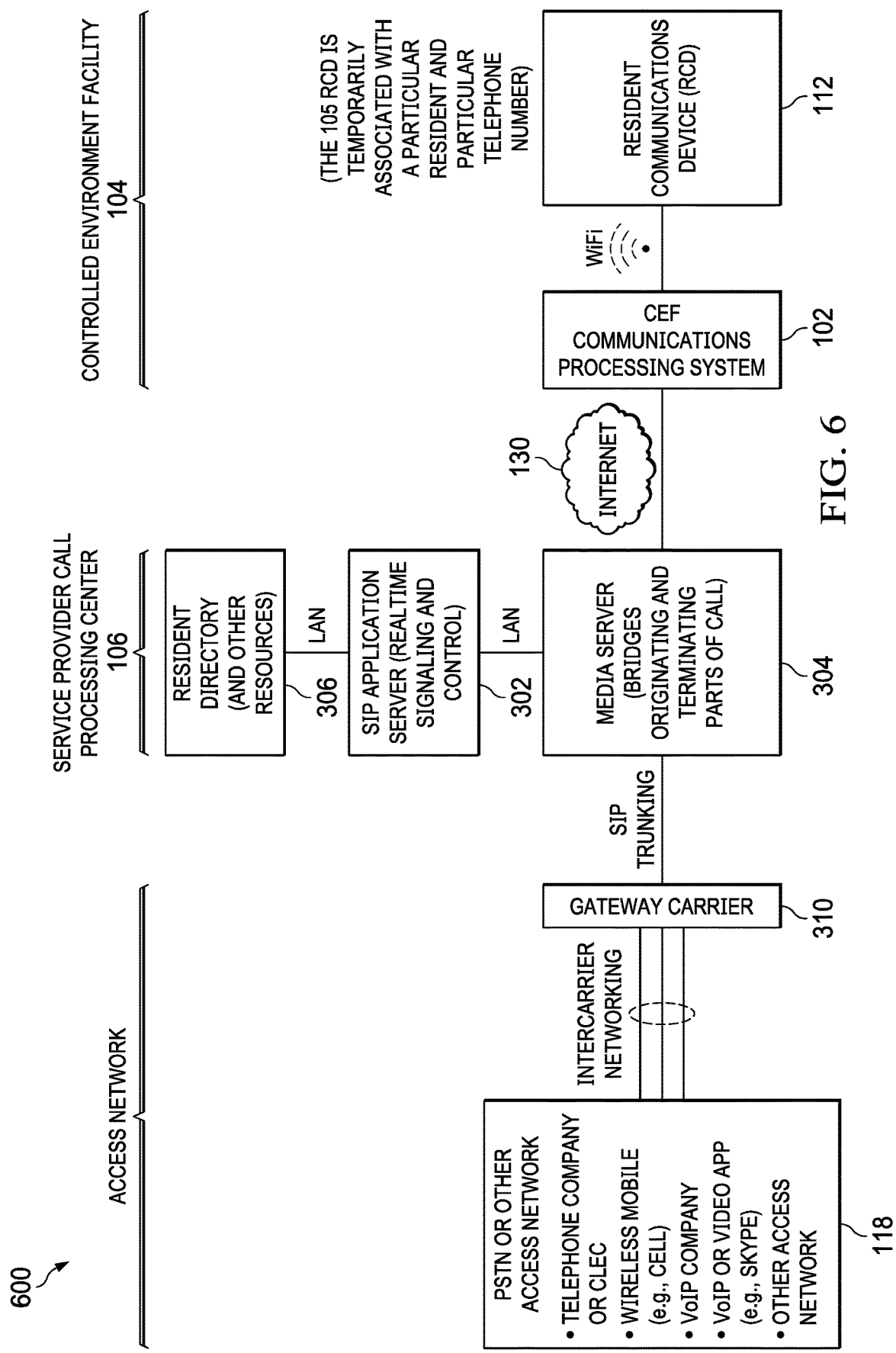

Having thus described the invention in general terms, reference will now be made to the accompanying drawings, which are not necessarily drawn to scale, and wherein:

FIG. 1 is a high-level diagrammatic illustration of an example controlled-environment facility communications environment for implementing a secure controlled-environment facility inbound and outbound calling platform in accordance with some embodiments of the present systems and methods, according to some embodiments;

FIG. 2 is a high-level diagrammatic illustration of an example secure controlled-environment facility outbound calling platform for outbound controlled-environment facility resident calling, in accordance with some embodiments;

FIG. 3 is a high-level diagrammatic illustration of an example secure inbound and outbound controlled-environment facility resident calling platform, in accordance with some embodiments;

FIG. 4 is a flowchart of an example process for inbound phone and video calls to controlled-environment facility resident telephone numbers assigned to controlled-environment facility resident communications devices, in accordance with some embodiments;

FIGS. 5A and 5B together comprise a flowchart of a more detailed example process implementation for inbound phone and video calls to controlled-environment facility resident telephone numbers assigned to controlled-environment facility resident communications devices, in accordance with some embodiments;

FIG. 6 is an example media path for secure inbound calling to controlled-environment facility resident, according to some embodiments; and FIG. 7 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

Herein, the term "service provider" generally refers to a communications service provider that specializes in serving the market of such controlled-environment facilities. In accordance with various embodiments of the present systems and methods, such a service provider may offer not only outbound calling services to controlled-environment facility residents, but also inbound calling services to such residents. Such service providers may or may not be designated as a communications common carrier under various statutes and regulations (at state or federal level). However, for provision of inbound calling the service provider may seek and receive certification(s) as an "Interconnected VoIP Carrier," or the like.

Limited access to communication devices and visitation services by controlled-environment facility residents may limit the ability of residents to successfully establish communication sessions with non-residents. Residents may be allowed access to communication devices according to strict visitation schedules that may not correspond to days and times during which friends and family members of the residents are regularly available to participate in a visitation session. Embodiments of the present systems and methods support increased communications between controlled-environment facility residents and non-residents by taking advantage of opportunities when a resident has access to a communications device and the resident appears to be available for a telephone or video call, via a controlled-environment facility resident communications device.

To such ends, and the like, the present systems and methods enable communications with residents of controlled-environment facilities, and specifically phone and video calls to controlled-environment facility resident telephone numbers assigned to controlled-environment facility resident communications devices. Hence, embodiments of the present systems and methods for inbound calling to controlled-environment facility residents allow persons outside the resident's controlled-environment facility, referred to herein as non-residents or non-inmates, such as friends and family of respective controlled-environment facility residents, to originate real-time, unscheduled, inbound telephone calls to controlled-environment facility residents holding facility-approved, or specially adapted, communications devices, such as tablet computing devices. Additionally, resident-to-resident (inmate-to-inmate) calls (i.e., calls between residents of the same or a different controlled-environment facility) may be carried out in accordance with various embodiments of the present systems and methods, particularly under various security constraints.

While as noted above, many controlled-environment facilities provide a means for their residents to place outbound calls, it is generally unfeasible to enable them to receive inbound calls. As used herein, "call" may refer to either telephone or video call that is, in accordance with embodiments of the present systems and methods either initiated or received by a resident of a controlled-environment facility. Additionally, it is the nature of controlled-environment facilities that there are often very strict security requirements including monitoring or recording of calls, pre-screening of callers, and specific billing requirements such as setting up and prepaying accounts for the payment of call charges. Thus, in controlled-environment facilities, authorized persons may make use of call monitoring technologies to monitor the calls or video sessions of residents by listening to them or viewing them in real time (as they occur). A further issue is that residents move around within the facility, so even if a resident had transient access to a certain phone number for inbound calls, this would not provide a feasible solution allowing them to receive such calls. Hence, to make an inbound calling service for controlled-environment facility residents practical, embodiments of the present systems and methods provide visibility to the calling party as to whether the resident is available-to-receive a call. As used herein "called party" refers to the person receiving a call and "calling party" refers to the person initiating a call.

In accordance with embodiments of the present systems and methods, controlled-environment facility resident communications devices such as resident handheld tablets may be leveraged to provide designated telephone numbers for residents of controlled-environment facilities. Yet, the assignment of these devices is still generally transient, often passing from one resident to another in a matter of hours or days. Hence, embodiments of the present systems and methods assign such devices telephone numbers out of a pool of numbers available to a controlled-environment facility service provider implementing the present systems and methods. Further in accordance with embodiments of the present systems and methods, outside callers may be shown a selected resident's availability to receive calls. Thereby, embodiments of the present systems and methods provide feasible inbound calling for residents of controlled-environment facilities which is practical for all parties involved, including authorities of the controlled-environment facility.

Whereby, embodiments of the present systems and methods provide an end-to-end inbound call to a controlled-environment facility resident based upon their own telephone number, which can be looked-up by an outside calling party in an on-line directory, provided all security conditions are met. To this end, embodiments of the present systems and methods also provide potential callers with visibility as to whether the controlled-environment facility resident they wish to call is available at the time of the call, as well as whether the potential caller has met all requirements of the calling service and the controlled-environment facility in order to place such a call. Once such requirements are met, and the calling party has determined (from the present secure controlled-environment facility inbound and outbound calling platform) that the resident they wish to call is available, the end-to-end call comprises two parts: an originating part of the call, to a controlled-environment facility service provider's call processing center; and, a terminating part of the call to the resident's communications device. These two partial calls are united together in a switching and routing system referred to herein as a secure controlled-environment facility inbound and outbound calling platform, where the phone numbers are assigned and published via an Internet website on a dynamic basis, and where all security and funding issues are managed effectively.

Embodiments of the present systems and methods enable inbound calls to controlled-environment facility resident telephone numbers and employ resident-associated communications devices deployed in the facilities. An inbound and outbound calling platform assigns a telephone number to each resident and associates a routable (IP) address of each resident communications device with such telephone number. This calling platform also presents an online directory to accessing inbound callers that lists residents the caller is allowed to call, the telephone number(s) of such resident(s), and whether such residents and their communications devices are ready to receive a call. The calling platform reconfirms such information upon an inbound call being placed to a telephone number assigned to a resident and signals the resident communications device associated with the resident assigned that telephone number. A controlled-environment facility communication processing system, or the like, routes the call to the resident communications device associated with the resident called and connects the call.

FIG. 1 is a high-level diagrammatic illustration of example controlled-environment facility communications environment 100 for implementing a secure inbound calling platform in accordance with some embodiments of the present systems and methods. Therein, example embodiments of the present systems and methods for inbound phone and video calls to controlled-environment facility resident telephone numbers assigned to controlled-environment facility resident communications devices may be practiced, as well as controlled-environment facility resident outbound calling, according to some embodiments.

FIG. 1 includes interconnecting systems and subsystems representing end-to-end media and data communications paths which can be used for voice and/or video communications sessions originated by a calling party outside the controlled-environment facility. Such a call may connect through the Public Switched Telephone Network (PSTN), via service provider data center, which may also house elements of the present distributed secure inbound calling platform, and finally terminate via the public internet or other Internet Protocol (IP) network to a controlled-environment facility. This controlled-environment facility may implement a controlled-environment facility communications processing system which may also include elements of the present distributed secure inbound/(outbound) calling platform.

Controlled-environment facility communication processing system 102 may facilitate the provisioning of telephone services, videoconferencing, online chat, and other communication services to controlled-environment facility 104. Additionally, some, all or most functions to provide telephone services, videoconferencing, online chat, and other communication services to controlled-environment facility may be performed by controlled-environment facility service provider call processing center 106. More generally, however, it should be noted that the present systems and methods the constituent subsystems and operations may assume a variety of forms and may be configured to serve a variety of facilities and/or users, whether deployed within or outside of a controlled-environment facility.

The present systems and methods employ a set of networked systems and processes which comprise a distributed communications control and transmission system. Some elements of this distributed system may be housed at controlled-environment facility 104 and are referred to herein as controlled-environment facility communication processing system 102. Controlled-environment facility communication processing system 102 may include routers, switches, servers, IADs, telephone and data wiring, Wireless Local Area Network (WLAN), etc., as discussed below, which may be located at controlled-environment facility 104. Controlled-environment facility communication processing system 102 enables resident communications devices, or other end-point devices, to connect, via the internet or other outside network(s) with non-residents, such as friends and family or other outside parties, through a secure controlled-environment facility outbound calling platform or a secure controlled-environment facility inbound and outbound calling platform, in accordance with embodiments of the present systems and methods. However, components of controlled-environment facility communication processing system 102 may also be housed at call processing center 106 of a service provider that specializes in the technical field pertaining to communications with residents of controlled-environment facilities. Additionally, as noted, resident-to-resident (inmate-to-inmate) calls (i.e., calls between residents of the same or a different controlled-environment facility) may be carried out in accordance with various embodiments of the present systems and methods, particularly under various security constraints In the context of a correctional facility, for instance, inmates may use telephones 108 to access certain communication services. Some facilities may provide residents of the controlled-environment facility with communication services, including video visitation, or the like, using controlled-environment facility communications terminals 110. Additionally, or alternatively, inmates may also use a personal computer wireless device (112), referred to herein as a controlled-environment facility resident communications device, an inmate (personal) communications device, or the like, to access such services.

Under the control of communication processing system 102, telephones 108, terminals 110 and/or devices 112 may be capable of connecting with a non-resident's (i.e., a person not committed to a controlled-environment facility) device 114 or telephone 116 across a publicly switched telephone network (PSTN) 118. For example, device 114 may be a mobile phone, whereas telephone 116 may be located at a non-resident's home, inmate visitation center, etc. Switch 120 may, as illustrated, be connected to router 132, or the like, which may in turn be connected to call center 103, via a public network (e.g. the Internet) or a private network, or the like (e.g. via a secure tunneling protocol over the internet, using encapsulation) (150) so as to connect calls across PSTN 118. Additionally, or alternatively, the non-resident may be at telephone 140, device 124 or personal or laptop computer 126 with camera 128, which is on an Integrated Services Digital Network (ISDN), Voice-over-IP (VoIP), or packet data network 130, such as, for example the Internet. Router 132 of communication system 102 may be used to route data packets associated with a call connection with outside telephone 122, device 124 or computer 126. The accompany FIGURES do not show all of the "building-block" components of the illustrated systems and networks, such as switches, routers, media converters, power supplies, Dynamic Host Configuration Protocol (DHCP) servers, Session Initiation Protocol (SIP) registrars, etc., other than specific differentiating features of embodiments of the present systems and methods.

In addition to providing certain visitation and communication operations, communication processing system 102 may ensure, particularly in correctional facility implementations, that an inmate's calls, video conferences, online chats, etc. are performed only with non-residents whose identities, devices, email addresses, phone numbers, etc. are listed in that inmate's Personal Allowed Number (PAN) or Pre-Approved Contact (PAC) list. Each inmate's PAN or PAC list may be stored, for example, in database 134 maintained by Administration and Management System (AMS) 136 (e.g. in a correction environment a Jail Management System (JMS). PAN and/or PAC list(s) may, in accordance with embodiments of the present systems and methods, comprise a list of (telephone) numbers for each resident, to whom the resident is permitted to place outbound calls. Such a list may be a function of both the resident's preferences, as well as the policies of the controlled-environment facility. In accordance with embodiments of the present systems and methods PAN and/or PAC list(s) lists are maintained as a function of secure controlled-environment facility outbound calling platform 138. An analogous list with respect to inbound callers may be referred to as the eligible caller list and may be maintained as a database that is part of secure controlled-environment facility inbound and outbound calling platform 140. In addition to PAN or PAC list(s), AMS 136 may also store inmate or resident profile data (RPD), as well as visitation rules applicable to each inmate or resident. A resident's RPD may include resident-specific data such as a permanent account number, Personal Identification Number (PIN), housing unit, room or cell assigned, dates of entry and/or release; offence or diagnosis, personal attorney or physician, etc.

As an example, in the context of a correctional facility, database 134 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; video and/or audio communication recordings; known or suspected gang or criminal affiliations; known or suspected affiliates, accomplices, or gang members; and any other information that may be relevant or useful to correctional facility staff to house and maintain inmates.

In many controlled-environment facilities, residents or inmates are restricted from communicating with persons outside of the controlled-environment facility using any device other than the system described above. Reasons for this include protection of persons outside of the controlled-environment facility from offensive, inappropriate, or illegal contact with an inmate. Additionally, these restrictions may help to prevent inmates from directing further illegal activity with conspirators located outside of the controlled-environment facility, witness tampering, victim protection etc. Administrators of the controlled-environment facility may wish to limit the inmate's contact to parties on the inmate's PAN or PAC list.

In some implementations, communication system 102 may be configured to perform call and/or video visitation monitoring operations configured to monitor and or record calls and/or video visitations (e.g., as electronic audio or video files). Such monitoring may be carried out to detect impermissible activity, such as attempts to initiate three-way calls, and/or for investigative purposes, such as detection of keywords related to criminal activity or the like. In scenarios where communication system 102 is located within the controlled-environment facility, it may have direct access to AMS 136. In other embodiments, however, communication system 102 may be located remotely with respect to the controlled-environment facility, such as at service provider call processing center 106, and access to AMS 136 may be obtained via a computer network such as, for example, network 130.

Controlled-environment facility communications terminals 110 may be provided in controlled-environment facility visitation areas, and/or visitation centers outside controlled-environment facility 104, for use by non-residents. In accordance with embodiments of the present systems and methods, communications terminals 110 may provide residents and non-residents with the ability to participate in video visitation sessions. In certain scenarios, communications terminals 110 may be mounted on a wall, within a booth, or as part of kiosk. In certain scenarios, controlled-environment facility communications terminal 110 may be a hardened terminal and may be installed in an area of the controlled-environment facility dedicated to providing residents with visitation sessions. Such controlled-environment facility communications terminal 110 may be referred to as an Intelligent Facility Device (IFD), which may be a video phone particularly adapted for use in a controlled-environment facility. A controlled-environment facility communications terminal 110 may be adapted to provide residents with various additional services in addition to visitation sessions. Such a fixed position video communications terminal may thus be a two-way video communications terminal shared by multiple residents of a controlled-environment facility who occupy the same housing area (served by the terminal) at the same time, or at different times.

In various embodiments, controlled-environment facility communications terminals 110 may each include a video display, a camera, and a handset that includes a microphone and speakers. The display may be any suitable electronic display such as, for example, a Liquid Crystal Display (LCD) or a touchscreen display (e.g., resistive, capacitive, etc.). The camera included on controlled-environment facility communications terminal 110 may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a speaker), a handle portion, and a mouthpiece portion (with a microphone). In certain embodiments, controlled-environment facility communications terminal 110 may allow a resident to utilize a headset with earphones and a microphone in place of a traditional handset.

Controlled-environment facility resident communications device 112 may be issued to a particular resident (in some embodiments, temporarily), activated by a resident's PIN, and capable of being dynamically associated with an (inbound) 10-digit telephone number by the use of the secure controlled-environment facility inbound and outbound calling platform (140) as described herein. For example, controlled-environment facility resident communications devices 112 may be tablet computing devices, smartphones, media players, or the like adapted and/or approved for use by residents of the controlled-environment facility (within the controlled-environment facility). Such controlled-Environment facility resident communications devices may be an appropriately configured resident tablet, or the like linked with an external communications network via a controlled-environment facility WLAN and the controlled-environment facility's communication processing system (102). Each controlled-environment facility resident communications device 112 may be particularly adapted for use in a controlled-environment. For example, in a correctional institution, jail, or the like, such a controlled-environment facility resident communications device, may have a specially adapted operating system and/or may be "stripped-down," particularly from the standpoint of what apps and/or hardware are provided or allowed on controlled-environment facility resident communications device 112, and/or connectivity afforded such a device. For example, such a device may employ an operating system kernel, which may be created for use in such a device in a controlled-environment facility. As a further example, the controlled-environment facility resident communications device may be adapted to only connect to a network provided by the controlled-environment facility, and/or in only certain locations, within the controlled-environment facility, such as may be controlled by availability of WLAN access, or the like, only being available in certain areas. That is, for example, where streaming and/or downloading may be compartmentalized, leveraging the structure of the controlled-environment facility, for example, limiting the availability of a WLAN signal, providing the stream through the placement of wireless access points, antenna directionality of such wireless access points, and/or the like. Further, the controlled-environment facility resident communications device may allow access to apps or content only upon application of security measures, by the device. Such security measures may include determining, by the device, DNS spoofing, DNS redirection, use of proxy servers for privacy and security, biometric validation, password validation, and/or the like.

Application programs or application software, generally referred to as "apps" is a subclass of software that employs the capabilities of a computing device, such as the resident communication device 112, to a task that the user wishes to perform. In accordance with embodiments of the present systems and methods, the controlled-environment facility resident communications device may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on controlled-environment facility resident communications devices might include apps of particular interest to residents of the controlled-environment facility. For example, such inmate communications devices provided to inmates of correctional facilities, might include apps that may be of particular use to an inmate, in general, such as access to a legal research service, or of more specific interest, such as providing an inmate nearing release, access to employment searching apps or the like. Hence, such inmate communications devices may be used to help soon-to-be released inmates to transition. For example, the inmate communications device may be used to communicate with a future employer, or the like. As such, inmate communications devices may be sponsored, or otherwise subsidized by organizations or companies, assisting with the transition of inmates into society.

Resident communication devices 112 may, in accordance with embodiments of the present systems and methods, be managed within (each) controlled-Environment facility 104 with the aid of an application server, a resident communication device server 142, that supplies certain feature functionality as well as keeping track of the PIN (i.e., the individual resident) authorized to use each respective device (112), or currently using a respective device (112). Resident communication device server 142 may, as illustrated, be a part of controlled-environment facility communication processing system 102, may be a part of AMS 136, or may be a separate server, or the like. Likewise, SIP registrar 144 is, in accordance with embodiments of the present systems and methods, a server located at (each) controlled-environment facility 102 that accepts SIP registrations (IP addresses) from resident communications devices 112. This facilitates inbound call routing because the IP addresses within the facility are dynamically assigned by DHCP server 146. That is, DHCP server 146 assigns an IP address to each resident communications device 112 connected to a controlled-environment facility LAN. DHCP server capability may also be integrated within a router (e.g., 132), in accordance with embodiments of the present systems and methods.

The systems at service provider call processing center 106 may include systems that are used to support outbound calling from residents of controlled-environment facilities and may be referred to herein as secure controlled-environment facility outbound calling platform 138. Embodiments of the present systems and methods may be implemented in conjunction with or by various environment elements, particularly controlled-environment facility communication processing system 102, controlled-environment facility resident communications devices 112, service provider call processing center 106, including secure controlled-environment facility outbound calling platform 138, which in turn, is a part of secure controlled-environment facility inbound and outbound calling platform 140, which may in turn include, various further elements as described below. To this end the present systems and methods for inbound phone and video calls to controlled-environment facility resident telephone numbers assigned to controlled-environment facility resident communications devices make use of "presence," a capability generally described in Internet Engineering Task Force (IETF) documents RFP 27778 (A Model for Presence and Instant Messaging) and RFC 3859 (Common Profile for Presence (CPP)), for use with Session Initiation Protocol (SIP). Service provider call processing center 106 may be a carrier-grade data center (i.e., operating around the clock with extremely low failure rates) with interconnecting links to telecommunications carriers and the Internet. Alternatively, service provider call processing center 106 may exist as a number of interconnected and/or redundant data centers serving a unified purpose. In either case, the service provider call processing center may house centrally located elements of the secure controlled-environment facility outbound calling platform 138 and secure controlled-environment facility inbound and outbound calling platform 140. Service provider call processing center 106 may supply centralized functionality including core switching elements for multiple controlled-environment facility (104) customers. Service provider call processing center 106 may also include operations support, power and environmental systems and/or the like, befitting a carrier-grade telecommunications data center.

Some elements of secure controlled-environment facility outbound calling platform 138 may be used to implement inbound calling, and hence, secure controlled-environment facility outbound calling platform 138, the outbound calling system, may be shown in some drawings and referred to herein as a single subsystem component of secure controlled-environment facility inbound and outbound calling platform 140. Secure controlled-environment facility outbound calling platform 138 may be a distributed, centralized communications platform in that it is located, in accordance with embodiments of the present systems and methods, at the service provider call processing center 106 or distributed in a number of such call processing centers. Secure controlled-environment facility outbound calling platform 138 supports a variety of communications services offered to residents of controlled-environment facilities, such as via interaction with the respective controlled-environment facility communication processing system (102). Secure controlled-environment facility outbound calling platform 138 provides switching and control for phone calls (and other services) that are outbound from a controlled-environment facility. Embodiments of the present systems and methods supplement secure controlled-environment facility outbound calling platform 138 to provide a secure controlled-environment facility inbound and outbound calling platform (140).

FIG. 2 is a high-level diagrammatic illustration of example secure controlled-environment facility outbound calling platform 138 for outbound calling, in accordance with some embodiments. Hence, FIG. 2 is a high-level diagrammatic illustration of the portion of the present systems and methods, which is common to both inbound calling and outbound calling, which is treated above, in FIG. 1, as a single system within secure controlled-environment facility inbound and outbound calling platform 140. Because of the many specialized requirements of call processing for a controlled-environment facility, including security, custom billing arrangements and real-time call monitoring, the general architecture of the connecting network from-and-to residents of controlled-environment facilities and parties outside those facilities can be viewed, or otherwise considered, as two separate calls that are bridged together via secure controlled-environment facility outbound calling platform 138. These two "half" calls may be referred to herein as the "originating call" and the "terminating call." In FIG. 1, the typical originating call is from a resident within controlled-environment facility 104 to secure controlled-environment facility outbound calling platform 138, and the terminating call is from the secure controlled-environment facility outbound calling platform 138 to a called party via PSTN 118.

The type of service provider who implements embodiments of the present systems and methods may have a secure controlled-environment facility outbound calling platform 138, or the like, in-place. Embodiments of the present systems and methods for secure inbound calling to residents of controlled-environment facility may employ components and aspects of such a secure controlled-environment facility outbound calling platform, or the like, which may be considered a subsystem, thereof, such as illustrated in FIGS. 1 and 3.

Secure controlled-environment facility outbound calling platform 138 comprises a VoIP core switching architecture such as may be embodied in SIP application server 202 and media server 204. Application-level signaling and control with outside networks is handled by SIP application server 202, which in turn, controls media server 204 for lower layers of operation, including transmission of voice, video and other "payload" packets.

For outbound calling, a resident of controlled-environment facility 104 utilizes a resident phone 108, resident video terminal 110, or the like, inside the facility. This phone or terminal is generally, but not necessarily, shared-use with other residents. The resident initiates a call to someone outside the facility by dialing their telephone number. The resident's originating call is initially processed via controlled-environment facility communication processing system 102 which is generally installed on the premises of controlled-environment facility 104. The communication processing system 102 may comprise Integrated Access Devices ("IAD") (not shown) which convert analog voice transmission and signaling (e.g., DTMF tones) into SIP-controlled VoIP, and vice versa, and one or more switches, routers (such as shown in FIG. 1) and/or the like which interconnect with the Internet or other suitable data network. A VoIP/SIP side of the IAD may be transmitted through a Local Area Network (LAN) at controlled-environment facility 104 to an access router, such as communication processing system router 132 providing Internet routing functionality and SIP signaling capabilities.

From the access router 132 the IP packets of the outbound call are transmitted via the Internet (130) to a router 206 located at service provider call processing center 106. This router 206 may be considered part of secure controlled-environment facility outbound calling platform 138. Router 206 places the packets on switches 208 comprising a LAN framework of secure controlled-environment facility outbound calling platform 138. Via the LAN, the SIP packets are conveyed to SIP application server 202 and the voice or "payload" packets are conveyed to media server 204. SIP application server 202 may be considered part of an intelligent network architecture, in that it can reach out to other servers and systems for instructions in processing the call. Such systems include databases to verify, for example, a resident's Personal Identification Number (PIN), voice biometrics, or the like, to verify whether the dialed telephone number is in a Personal Account Number (PAN) list of the resident making the call, and whether there is adequate funding in place through funding accounts of either the resident or the called party in order to pay for the call. Other media processing systems interact with the body of the call (i.e., the voice or other media), via media server 204. These systems may also be in communication and under the supervision of SIP application server 202. These additional systems include, for example voice recognition system 210 (a security measure), Interactive Voice Response (IVR) 212 system, call monitoring systems, on-line call-recording and storage system 214, etc. Many controlled-environment facilities, especially jails and prisons, apply voice recognition as a security device to make sure the resident (and/or non-resident) engaging in the call has been, and/or remains, properly identified. The aforementioned PIN checks, PAN checks, funding checks, voice biometric checks, and/or the like, are applied before secure controlled-environment facility outbound calling platform 138 attempts to extend the call to PSTN 118. IVR 212 may play announcements and instructions for inbound/outbound caller communication with/by residents of the controlled-environment facility. IVR 212 may, in turn, receive replies in various formats to specific questions, including identification of facility, authorization to apply billing, notification the call is being monitored/recorded, etc.

To access the PSTN, both the SIP packets and the VoIP packets are handed off to an Interexchange Carrier (216) which routes the call to the desired called party using the industry-standard telephone number that was dialed by the resident (e.g. an E.164 international standard for telephone number under the International Telecommunication Union (ITU)).

Once the outside called party answers, IVR 212 plays announcements to the called party and receives affirmative responses from the called party before allowing the call to proceed. If necessary, there may also be an opportunity for the called party to bridge over funding platform 218 in order to create a funding account or to add funds to an existing account.

In general, call events are recorded in a call detail recording system (not shown), to thereby create a Call Detail Record (CDR), or the like. In addition, the call (i.e., the voices), may be recorded into on-line recording and storage 214, for future review by authorized personnel. As noted, telephone calls and video sessions for many controlled-environment facilities are fully recorded and stored, in some cases for years, in case they are later needed by the operators of the facilities or other persons with legal authorization to review them. Thus, very large and easily accessible storage capacity 214 may be integrated into secure controlled-environment facility outbound calling platform 138 and secure controlled-environment facility inbound and outbound calling platform 140.

If the call is completed, (e.g., accepted by the called party and a connection made with the resident), the CDR may then be processed by billing system 220. All calls to or from residents of a controlled-environment facility involve the use of specialized technologies and functionalities including security features, call monitoring and call recording. The pricing for such services may be negotiated by a controlled-environment facility communications service provider with each controlled-environment facility. Funding is generally obtained from a variety of prepaid accounts managed via account funding platform 218. Billing system 220 is specialized for use in conjunction with controlled-environment facility communications. In accordance with embodiments of the present systems and methods an existing service provider billing system (and account funding platform) for outbound calls may be modified and expanded to handle billing and funding for inbound calls, as well, or a new or separate billing system (and/or account funding platform) may be used for inbound calls to controlled-environment facility residents.

Other related systems of the service provider call processing center 106 may, as noted, include operations support 222, power and environmental systems 224, and/or the like, as befitting a communications service provider data center. Operations support, for example, may, in turn, include circuit and packet testing equipment, performance monitoring systems, provisioning and inventory systems, trouble ticket systems, a network operations center, network and data security, etc. Environmental and security systems may include, by way of example, power, air conditioning, backup power (e.g. generators, or the like), fire suppression, physical security, etc.

Other components of secure controlled-environment facility outbound calling platform 138 may include its web user interfaces (UI) 226, which may provide a web portal for account management access, for the general public. For example, web portal for account management pay provide access to the systems of the secure controlled-environment facility inbound and outbound calling platform (140) from members of the general public for access to a resident directory, access to the account funding platform (218), etc. A secure controlled-environment facility outbound calling platform (and secure controlled-environment facility inbound and outbound calling platform) UI 226 may be provided for administrative and technical personnel of the service provider, as well as controlled-environmental facility staff, etc. Secure controlled-environment facility outbound calling platform and secure controlled-environment facility inbound and outbound calling platform user interface may provide, via direct or web access, access for administrative personnel of a controlled-environment facility to update the eligible caller lists, configure individual account permissions and PINs (if not accessed via AMS 136), and access to enhanced features (such as investigative capabilities used by correctional institutions).

Also, secure controlled-environment facility outbound calling platform 138 may be used, in accordance with some embodiments of the present systems and methods to implement resident-to-resident (inmate-to-inmate) calls (i.e., calls between residents of the same controlled-environment facility or different controlled-environment facilities), particularly under various security constraints, consistent with the above (and below) description(s).

FIG. 3 is a high-level diagrammatic illustration of example secure controlled-environment facility inbound and outbound calling platform 140, in accordance with some embodiments. Secure controlled-environment facility inbound and outbound calling platform 140 may be deployed in the broader network architecture that provides inbound calling to residents of a controlled-environment facility (as well as outbound calling by such residents). FIG. 3 incorporates secure controlled-environment facility outbound calling platform 138, more fully described in FIG. 2, as a singular component in order to highlight the aspects of the network architecture for inbound calling and secure controlled-environment facility inbound and outbound calling platform 140. Because of the many specialized requirements of call processing for a controlled-environment facility, including security, custom billing arrangements and real-time call monitoring, the general architecture of the connecting network to-and-from residents of controlled-environment facilities and parties outside those facilities can, in accordance with embodiments of the present systems and methods, be viewed, or otherwise considered, as two separate calls that are bridged together via secure controlled-environment facility inbound and outbound calling platform 140. These two "half" calls may be referend to herein as the originating call and the terminating call. In FIG. 3 the originating call is from an outside calling party via PSTN 118 to secure controlled-environment facility inbound and outbound calling platform 140, and the terminating call is from secure controlled-environment facility inbound and outbound calling platform 140 to a resident within controlled-environment facility 104, via controlled-environment facility communication processing system 102.

A service provider who implements secure controlled-environment facility inbound and outbound calling platform 140 may have a secure controlled-environment facility outbound calling platform 138, or the like, such as described with respect to FIG. 2, in place. Embodiments of the present systems and methods for secure inbound calling to controlled-environment facility residents may employ components and aspects of such a secure controlled-environment facility outbound calling platform, or the like.

Elements of secure controlled-environment facility inbound and outbound calling platform 140 which are not included in secure controlled-environment facility outbound calling platform 138 include, at least: SIP Registrar 144 (discussed above), secure controlled-environment facility inbound and outbound calling platform SIP application server 302, secure controlled-environment facility inbound and outbound calling platform media server 304, resident directory 306, presence server 308, presence client (software installed on controlled-environment facility resident communication devices 112), gateway carrier 310, telephone number server 312, eligible caller database 314, consolidated AMS 318, location server 320, and/or the like.

Secure controlled-environment facility inbound and outbound calling platform 140 may be viewed as a superset of secure controlled-environment facility outbound calling platform 138 that allows both inbound and outbound calling for residents of a controlled-environment facility, in accordance with embodiments of the present systems and methods. Secure controlled-environment facility inbound and outbound calling platform 140 includes elements of outbound secure controlled-environment facility outbound calling platform 138 plus a number of additional elements, as discussed above.

As described below, secure controlled-environment facility inbound and outbound calling platform 140 may be used to implement non-resident-to-resident (non-resident-to-inmate) calls. However, in accordance with some embodiments of the present systems and methods secure controlled-environment facility inbound and outbound calling platform 140 may also be used to implement resident-to-resident (inmate-to-inmate) calls (i.e., calls between residents of the same controlled-environment facility or different controlled-environment facilities), particularly under various security constraints, consistent with the above (and below) description(s).

Call-processing by secure controlled-environment facility inbound and outbound calling platform 140 employs a VoIP core switching architecture comprising SIP application server 302 and media server 304. Application-level signaling and control with outside networks is handled by SIP application server 302, and in turn, SIP application server 302 controls media server 304 for the lower layers of operation including the transmission of voice, video and other "payload" packets. SIP application server 302 and media server 304 are shown separately in FIG. 3, although similar elements, SIP application server 202 and media server 204 are depicted and described with respect to FIG. 2, with respect to secure controlled-environment facility outbound calling platform 138. However, the differing aspects of inbound calling may call for a different secure controlled-environment facility inbound and outbound calling platform SIP application server (302) and/or secure controlled-environment facility inbound and outbound calling platform media server (304), or at least significant modifications to SIP application server 202 and/or media server 204 of secure controlled-environment facility outbound calling platform 138 to accommodate the requirements of inbound calling. Other core components of secure controlled-environment facility inbound and outbound calling platform 140 include resident directory 306, presence server 308, etc.

SIP application server 302 integrates multiple higher level elements and processes (e.g., resident directory 306, presence server 308, media server 304) into an intelligent networking architecture. That is, in accordance with embodiments of the present systems and methods, a network architecture of interconnecting systems that are used for various call processing operations, wherein SIP application server 302 may be generally considered a central system of an intelligent network architecture. SIP application server 302 also supplies SIP proxy and/or back-to-back user agents for the networking layer. As a SIP proxy SIP application server 302 provides network infrastructure for SIP to which user agents can send registrations, invitations to voice or video sessions and other requests. Herein, "back-to-back user agents" refers to a networking configuration for a SIP application server for bridging two separate SIP calling sessions into a single communications path. SIP application server 302 additionally communicates with controlled-environment facility communication processing system 102 and gateway carrier 310 to PSTN 118. Along with supplying other system resources, SIP application server 302 controls media server 304 to unite voice or video streams into a single communications pathway from PSTN 118 to controlled-environment facility communication processing system 102.

Thus, SIP application server 302 is a call control system that translates incoming telephone number call digits into a SIP address for termination to a resident communications device (112) inside a controlled-environment facility (104). It also provides additional capabilities of special handling of calls in progress as frequently used with respect to communications involving a controlled-environment facility (resident). SIP application server 302 incorporates SIP proxy function and/or back-to-back user agents, as well as signaling protocols for call setup. SIP application server 302 also controls a database of inbound telephone number supplied by a wholesale supplier of such numbers. When there is an incoming call to secure controlled-environment facility inbound and outbound calling platform 140, SIP application server 302 interrogates resident directory 306 translation information, but may also query, in real-time, presence server 308, funding system/platform 218 and/or consolidated AMS Database-server 318, prior to completing the call to a resident communications device (112).

Media server 304 provides a Service Switching Point (SSP) that provides the physical transmission path for call or video session through secure controlled-environment facility inbound and outbound calling platform 140). Thereby, media server 304 bridges together the originating call and the terminating call to create one unified end-to-end communications session. Media server 304 also bridges other media processing systems into the call as needed.

Resident directory 306 consolidates data inputs from multiple systems into a directory record for each eligible resident. Resident directory 306 also assigns telephone numbers to such residents for inbound calling from an available pool of numbers maintained by telephone number server 312. Telephone number server 312 is, in accordance with embodiments of the present systems and methods, a repository of available telephone numbers, including 8YY numbers (e.g., 800 numbers, 888 numbers or other "toll free" numbers as defined in the standard North American Number plan), along with current telephone number assignments to residents. Unused telephone numbers, which are still assigned to residents may be returned to inventory, if not used for a period of time, or if consolidated AMS 318 shows the inmate has been released. In either case, a "cooling off" period for the telephone number may be employed before it is assigned to another resident. Resident directory 306 additionally serves as an on-line lookup system for the telephone numbers and other information pertaining to residents in controlled-environment facilities whom members of the public wish to locate or call. Such additional information may include the callable status of the resident (e.g. whether there is a temporary block on an inmate, a block of inmates or entire housing unit due to security or other measures, etc.), the status of funding accounts which may be used to place the call, estimated costs of the telephone call or other communications session, current availability or "ready to receive" status of a resident (communications device) and/or other resident data. Resident directory 306 may also provide SIP application server 302 a real-time translation from incoming telephone numbers to reachable SIP addresses of residents within controlled-environment facilities. Resident directory 306 may also provide a bridge to funding platform 218, if necessary and/or, to eligible caller platform (database server) 314 if the calling party wishes to be added to the resident's eligible caller list. The eligible caller list is a list of persons or entities outside a controlled-environment facility who, with respect to each resident of the facility, are allowed to place inbound calls to such resident. As noted, this is similar to the PAN list for the resident's outbound calls. To wit, a PAN database (e.g. as maintained by AMS 136), may provide input to the eligible caller platform 314 of secure controlled-environment facility inbound and outbound calling platform 140. Thereby, the eligible caller list is a function of both the resident's preferences as well as the policies of the controlled-environment facility. This list may be maintained on eligible caller database server/platform 314.

Resident directory 306 can be accessed via web user interface 316 by members of the general public. Resident directory 306 also provides real-time call-processing information used by the SIP application server 302 and other components and subsystems of secure controlled-environment facility inbound and outbound calling platform 140. For example, resident directory 306 provides the SIP application server a real-time translation from incoming telephone numbers to reachable SIP addresses of residents within controlled-environment facilities. Within resident directory 306, directory records are cross-indexed with Uniform PINs (UPINs) created and maintained by consolidated AMS 318. The UPIN is an expanded version of the resident PIN with facility ID information added to the PIN issued to the resident by their controlled-Environment facility. Use of UPINs provide a relatively unique system-wide identifier for indexing all residents, such as from multiple facilities, in eligible caller database 314, consolidated AMS 318, resident directory 306, and/or the like.

Thus, in accordance with embodiments of the present systems and methods the directory record for each controlled-environment facility resident is the full set of data relating to each resident that is contained in resident directory 306 and presented selectively based upon the appropriate queries. The directory records are multi-indexed and can be accessed different ways by different entities based upon their requirements for information. For example, a member of the general public may use the resident directory to "find" a particular resident, and discover whether that resident has access to inbound calls, whether they already have a telephone number or 8YY number issued, how to become eligible to call the resident and how to set up funding to do so. Access to such information may be restricted in various ways according to the policies of the specific controlled-environment facility in which the resident is housed. On the other hand, internal secure controlled-environment facility inbound and outbound calling platform 140 systems such as the SIP application server 302 may access the resident directory 306 using as key the telephone number or 8YY number presented from gateway carrier 310. The directory record presents information on a selective basis depending upon the needs and level of authorization of the requesting party or entity. Fields of the directory record include (but are not limited to): Resident's name, present location, UPIN, telephone No, 8YY number, SIP URI (Resident's current network location), treatment protocol, calling party status, funding status, etc. For example, the treatment protocol may be a set of rules for audio recordings (part of secure controlled-environment facility inbound and outbound calling platform 140, e.g. maintained by consolidated AMS 318) that is played for and responded to, using IVR system 212, by an inbound caller before the call is allowed to be completed to a resident within controlled-environment facility 104. The treatment protocol may be indexed according to the specific facility, and may also be indexed by specific resident and/or caller, in accordance with various embodiments.

Consolidated AMS 318 extracts resident information primarily from controlled-environment facility-based AMS databases and systems (134 and 136) and resident communications device server 142, including but not limited to the PINs of residents, their SIP addresses and local IP addresses of handheld communications devices (112) associated with each resident. This information is used at secure controlled-environment facility inbound and outbound calling platform 140 to determine how to route an inbound call based upon a dialed telephone number which may be dynamically assigned and re-assigned as residents move in and out of the facility, or lease and un-lease the numbers, or exchange their communications devices. The consolidated AMS also creates a UPIN index of all residents reachable by secure controlled-environment facility inbound and outbound calling platform 140, regardless of which controlled-environment facility they occupy. This UPIN index is shared with other systems such as resident directory system 306.

Presence server 308 is the server side of a specialized client-server data communications system used for registering the real-time availability of a resident to receive calls. The client in this case is a software app which is associated with a particular resident communications device. To this end, presence server 308 collects presence event packages sent by resident communications devices 112 (from different controlled-environment facilities) and maintains a real-time presence status available to the resident directory and other systems.

For example, in accordance with various embodiments of the present systems and methods, presence client software, in the form of a persistent presence app, may be installed on controlled-environment facility resident communications devices 112. Presence functionality is used by the controlled-environment facility resident communications device to signal centralized presence server 308 and/or an associated database whether the controlled-environment facility resident communications device is ready to receive incoming phone calls. This "ready-to-receive" status, with respect to the controlled-environment facility resident communications devices, may be determined in the presence client when the device is powered on, is connected to a wireless network (internal to the controlled-environment facility) capable of connecting phone calls, presence has been allowed on the device (such as by the resident) or not disallowed, the device is in a location that allows inbound calls (if a localization function is established by the controlled-environment facility), and the device is not engaged in some other activity (such as an education session or another call) that prevents it receiving an incoming call.

A "ready-to-receive" status with respect to a resident entails additional considerations, determined via a data interface between controlled-environment facility AMS 136 and centrally-located control system of secure controlled-environment facility inbound and outbound calling platform 140 (e.g. consolidated AMS 318), such as may be implemented by controlled-environment facility communication system 102 and/or service provider call processing center 106, respectively. These considerations may call for the resident to enter a PIN on the device and may include determining the resident's "class-of-service," by AMS 136/318, which must allow the resident to receive inbound calls for resident ready-to-receive status. Further, an inbound call function of the device must not have been restricted by the facility, such as for reasons including time-of-day, special situations or disciplinary actions against the resident.

"Full ready-to-receive" status indicates that both the device and the resident operating the device are ready-to-receive inbound calls according to the above criteria.

Changes in presence status of controlled-environment facility resident communications devices 112, whether this change in status is establishment of a full ready-to-receive status or loss of such status, are transmitted via a presence event package (PEP) over SIP protocol through a controlled-environment facility wireless network, and over the Internet (i.e. network 130), to centrally located presence server 308 (which may be a part of secure controlled-environment facility inbound and outbound calling platform 140, as illustrated). Presence data for all residents served via secure inbound calling platform 100 (which may include residents from multiple controlled-environment facilities) is maintained on presence server 308 and thereby made available to resident directory 306 with the current ready-to-receive status of resident/device combinations.

Thus, the presence server collects changes in this availability status and makes it available to other systems, such as resident directory 306, consolidated AMS 318 and SIP application server 302. Typical controlled-environment facility communications systems do not employ a presence server, or the like, since a presence server is only useful for inbound calling to the facility and not for the outbound calling which comprises typical controlled-environment facility calling. Presence information is provided, in accordance with embodiments of the present systems and methods, to would-be calling parties, via web user interface 316, in resident directory 306, so that calling parties do not have to engage in trial-and-error to find times the resident they wish to reach is available to receive a calling party inbound call.

Gateway carrier 310 may be a Competitive Local Exchange Carrier (CLEC) and/or Interexchange Carrier (IXC) that provides the service provider with a SIP trunking interface to PSTN 118 for purposes of receiving the originating inbound calls from the calling parties accessing through the PSTN or other networks (e.g. the Internet, using VoIP, or the like). As a functional comparison in the outbound direction, an IXC, a communications common carrier, may accept outbound VoIP calls from the secure controlled-environment facility outbound calling platform 138 located at service provider call processing center 106 and terminates them to phone numbers on the PSTN (118) or to other publicly accessible addresses.

A "responsible organization" ("RespOrg") acquires and manages routing (to Interexchange Carriers) of 8YY numbers. In accordance with embodiments of the present systems and methods, the practicing controlled-environment facility communications service provider may become its own RespOrg or can use the services of a third party. In either approach, the 8YY number would be routed to an Interexchange Carrier, connecting with secure controlled-environment facility inbound and outbound calling platform 140 using SIP trunking.

Location server 320 may also be located at service provider call processing center 106. Location server 320 gathers registration information from SIP registrars 144 at each controlled-environment facility (104) served by secure controlled-environment facility inbound and outbound calling platform 140. Data may be recorded in a database associated with the location server that maps a SIP address of a user to a current IP address of the user's resident communications device (112), which may be changed periodically by DHCP server 146 of the respective controlled-environment facility. A companion device of location server 320 is SIP registrar 144, which may, in accordance with embodiments of the present systems and methods, be located at each controlled-environment facility 104. SIP registrar 144 associates a SIP address active at that facility with the then-current (routable) IP Address of a respective resident communications device (112), enabling the device to receive incoming SIP-based telephone calls. Also, as noted, SIP registrar 144 provides this information to SIP location server 320. That is, SIP registrar 144 places these SIP registrations in a database associated with SIP location server 320 located at service provider call processing center 106. This facilitates inbound call routing because the (routable) IP addresses within the site are dynamically assigned by the DHCP server.

Telephone number server 312 is a repository of all available telephone numbers, including 8YY numbers. 8YY is the FCC designation for a series of "toll-free" telephone number prefixes including the well-known "800 numbers." 8YY became the designation when additional prefixes were required in order to meet customer demand. Current 8YY prefixes include: 800, 888, 877, 866, 855, 844 and 833. These telephone numbers may be obtained from a gateway carrier 310 or other responsible organization, by the service provider offering secure controlled-environment facility inbound and outbound calling platform-based inbound calling services to controlled-environment facilities. In accordance with embodiments of the present systems and methods, the telephone number server (312) may have an electronic interface with such wholesale suppliers of telephone numbers and will serve as a system intermediate between such suppliers and resident directory 306 of secure controlled-environment facility inbound and outbound calling platform 140. Resident directory 306 associates the telephone number or 8YY number from the inventory with a particular resident and with a SIP address of the device associated with such resident.

Eligible caller platform and database 314 is a resource that may be used by and interconnected with, resident directory 306, as well as consolidated AMS 318 and SIP application server 302. Eligible caller platform 314 ensures that only pre-authorized persons, known as "eligible callers," can obtain access to the telephone numbers of selected controlled-environment facility residents for inbound calling, and that only such eligible callers will be able to dial through the system to such residents. The eligible caller list maintained in eligible caller database server 314 is unique to each resident. This list contains the names of eligible callers (who may need to be cleared in advance) as well as any authentications required of the eligible callers, such as an authorization code to be given at the time a call is placed, if required by the particular facility. As referred to herein, an "authorization code" is a sequence of characters entered by an inbound caller, generally in response to a voice prompt, in order to confirm their identity.

In accordance with embodiments of the present systems and methods, eligible caller database/platform 314 may be generally analogous to the PAN and/or PAC list(s) discussed above for outbound calls originated by the resident, such as maintained on AMS database 134, for use in facilitating and managing inbound calls to resident controlled-environment facility resident communications devices 112. When an inbound caller accesses resident directory 306, such as via non-resident device 124 or non-resident computer 126, directory 306 will query the eligible caller database(s) to determine what resident(s) the particular inbound caller is allowed to call. This list will be set up according to the rules of each controlled-environment facility (correctional institution) housing such residents (inmates). If the particular inbound caller is eligible to call a designated resident, the caller will be able to see the 10-digit North American numbering plan number assigned to the designated resident's controlled-environment facility resident communications device 112 and other information concerning the designated resident's ready-to-receive status. The secure controlled-environment facility inbound and outbound calling platform 140 will query a payment account system, such as funding platform 218 and/or billing system 220, to determine whether the particular inbound caller has available funds for an inbound call to the designated resident. If not, the particular inbound caller may be given options to fund their billing account with the funding platform 218.

Thus, in accordance with embodiments of the present systems and methods, web-based resident directory 306 manages the 8YY telephone numbers assigned to residents and provides visibility of these numbers to eligible callers. Resident directory 306 associates the dynamically-assigned SIP address of the controlled-environment facility resident communications devices 112 with a 10-digit North American numbering plan 8YY-type telephone number taken out of an inventory of telephone number server 312 purchased as wholesale block from an interexchange carrier 216, gateway carrier 310 or the like.

The database server 314 may be indexed by UPIN for real-time access by resident directory 306 and also sends updates of status changes to consolidated AMS 318, which in turn, provides support for real-time call processing by SIP application server 302, as discussed above. The general public will, in accordance with embodiments of the present systems and methods, reach eligible caller database server 314 by being bridged from resident directory 306 which is reached via web interface 316.

FIG. 4 is a flowchart of example process implementation 400 for inbound phone and video calls to controlled-environment facility resident telephone numbers assigned to controlled-environment facility resident communications devices, in accordance with some embodiments. Therein, each correctional facility inmate is assigned a telephone number, at 402. Such assignment may be made by a controlled-environment facility inbound and outbound calling platform (140), or the like. The controlled-environment facility inbound and outbound calling platform may also, at 404, associate a routable IP address, or the like, of each resident communications device with the telephone number assigned to a controlled-environment facility inmate associated with the device.

Each of the resident communications devices (112) deployed in at least one controlled-environment facility (104) may run a presence app that causes each resident communications device to transmit, at 406 a PEP from each respective resident communications device that is ready to receive being operated by a resident that is ready to receive. This PEP may be sent, at 406, for receipt by a presence server (308), or the like.

At 408 one or more controlled-environment facility service provider data/call center servers (e.g. secure controlled-environment facility inbound and outbound calling platform 140) present an online directory (316) for access by inbound callers. This online directory lists names of residents that an accessing inbound caller is allowed to call, telephone numbers of resident communications devices of the residents the inbound caller is allowed to call, whether the resident communications devices and the residents the inbound caller is allowed to call are ready to receive a call, whether funds are available in an account of the accessing inbound caller to call residents listed in the online directory, and/or the like.

Thus, a non-resident caller who is on a particular controlled-environment facility resident's approved list of callers, and who has a funding account set up in advance, may place a call to the resident following looking up the controlled-environment facility resident's unique telephone number on a web-based controlled-environment facility resident directory provided at 408. As noted, this telephone number may be an 8YY number (i.e. a toll-free as to the non-resident's home phone line or cell phone). However, charges will be applied in a separate stage of the call. In accordance with embodiments of the present systems and methods, the controlled-environment facility resident's unique telephone number will only be visible at 408 if the inbound caller is on the eligible caller list for that particular controlled-environment facility resident. As noted, the controlled-environment facility resident directory, may, in accordance with various embodiments of the present systems and methods, also indicate whether the controlled-environment facility resident is ready to receive a call, as discussed in greater detail above. Further, the controlled-environment facility resident directory presented at 408 may also indicate whether the inbound caller has funds available in a calling account to make the call, if not, methods of establishing or funding an account to pay for the call may be offered via the directory. The inbound caller may then dial the controlled-environment facility resident number obtained via the directory, normally, via a landline, cellular telephone, or the like.

A SIP application server (302), or the like, translates a telephone number called by one of the inbound callers into an internet protocol address of the resident communications device this telephone number is assigned to, at 410. However, before a resident operating a called resident communications device is allowed to answer the call, the secure controlled-environment facility inbound and outbound calling platform 140 may determine/confirm the calling party as eligible to call the controlled-environment facility resident. Thus, the secure controlled-environment facility inbound and outbound calling platform (140), or the like, may identify the inbound caller at 412, such as described above. At 414 the secure controlled-environment facility inbound and outbound calling platform, or the like, may determine whether the inbound caller is eligible to call a resident assigned the one telephone number, such as in conjunction with the AMS (136/318) and its database (134).

At this point, the secure controlled-environment facility inbound and outbound calling platform (140) may determine, such as from the controlled-environment facility resident directory (306), whether the controlled-environment facility resident device is ready to-receive a call and determine whether funds are available to pay for the call. To this end, the secure controlled-environment facility inbound and outbound calling platform, or the like, may determine whether the resident and the resident communications device (112) the called telephone number is assigned to are ready to receive the call at 416, such as in conjunction with the presence server (308) (at call processing center 106). At 418, the secure controlled-environment facility inbound and outbound calling platform, or the like, determines whether funds are available in an account of the inbound caller for the call.

If all of these conditions are not met, the secure controlled-environment facility inbound and outbound calling platform (140) may direct the caller appropriately, such as to a funding platform (218), or to a set of directions, such as may be offered via an IVR (212), for requesting approval to call the controlled-environment facility resident, etc. However, if the caller has been removed from the controlled-environment facility resident's eligible caller list (314), the caller may not be able to complete the call, regardless.

If all the above conditions are met, the caller may be presented a recorded message informing them that the call is to a controlled-environment facility resident (e.g. an inmate of a particular correctional facility, that charges will apply, that the call may be recorded, etc.). The caller may be required to respond affirmatively to a voice-prompt, or the like, such as may be presented via an IVR (212), whether to allow the call to proceed.

The call will then "ring" on the called controlled-environment facility resident's communications device (112), and the resident will have the ability to answer. For example, at 420, the controlled-environment facility communication processing system (102), or the like, signals the resident communications device the called telephone number is assigned to. Such action may be taken upon identification of the inbound caller, determining the inbound caller is eligible to call a resident assigned the one telephone number, determining the resident and a resident communications device the called telephone number is assigned to is ready to receive the call, determining funds are available in an account of the inbound caller for the call, etc.

In accordance with various embodiments of the present systems and methods, the controlled-environment facility resident may also be presented the caller ID of the inbound caller, on the resident's communications device (112) and may be presented an option whether to answer, reject or allow the call to go to voicemail. Also, if the called resident communications device is no longer ready to receive, is engaged in another call, or the like, the caller may be given an option to set up an automatic callback, to leave a voicemail, or the like. If the call is answered, the controlled-environment facility resident and caller may engage in a normal telephone call, pursuant to controlled-environment facility procedures (e.g. the call may be recorded, subject to continuous voice recognition verification procedures, etc.). However, if the call is accepted by the resident, the call is routed and connected to the resident's communications device (112) at 422, such as by the controlled-environment facility communication processing system (102), or the like. Thereafter, either party may be enabled to "hang up" to end the call.

FIG. 4 is described above with respect to inbound calling by a non-resident. However, as noted, some embodiments of the present systems and methods may implement resident-to-resident (inmate-to-inmate) calls (i.e., calls between residents of the same controlled-environment facility or different controlled-environment facilities), particularly under various security constraints, consistent with the above (and below) description(s).

As noted, billing will be applied against an account of the caller. However, in alternative implementations, using alternative arrangements (not described herein) controlled-environment facility resident may have the ability to fund inbound calls from eligible callers via a trust account maintained to the benefit of the controlled-environment facility resident, such as a resident's calling account, such as through establishment of an 8YY number.

FIGS. 5A and 5B together comprise a flowchart of more detailed example process implementation 500 for inbound phone and video calls to controlled-environment facility resident telephone numbers assigned to controlled-environment facility resident communications devices, in accordance with some embodiments. Therein, operation of one or more embodiments of the present secure controlled-environment facility inbound and outbound calling platform (140) is described. As referred to herein, an "outside caller" may be a person initiating an inbound telephone call or (unscheduled) video session to a resident of a controlled-environment facility via the present secure controlled-environment facility inbound and outbound calling platform (140). Outside callers wishing to originate a call to a resident of a controlled-environment facility (104) will, in accordance with embodiments of the present systems and methods engage in the following steps.

At 502, the outside caller may look up a telephone number of the resident to be called via a web interface (316) to a resident directory (306). At 504, personal authorization for the outside party to call the resident may be established by the outside party becoming listed on the resident's eligible caller list maintained on the eligible caller database (314), which is also accessed via the resident directory (306) At 506, funding of an account to pay for the call may be set-up, unless the resident has already established an account that will fund the call (e.g., an 8YY-number). In this regard, access to a funding platform (218), for this purpose, may be provided via the resident directory accessed at 502, or directly via its own web user interface, in accordance with embodiments of the present systems and methods. When these preparations are met, the calling party can check, at 508 to see if the resident is ready-to-receive a call. This can be done on-line using the resident directory, which at 508 displays such status. Optionally, the calling party can ask to be notified by various automatic methods when the resident becomes available, in accordance with some embodiments of the present systems and methods.

In accordance with the above description, the resident has been issued a North American standard telephone number, so this may be dialed in the normal fashion from a telephone, cell phone or other calling device, by the calling outside party, at 510. At 512, the call is processed through the PSTN (118) via connecting carriers using standard North American routing for communications carriers to a gateway carrier (310) that has a contract with the service provider of inbound calling to controlled-environment facilities. At 514, the gateway carrier (310) translates the incoming telephone number to a SIP/VoIP format for hand-off to the inbound calling service provider at their call processing center (106). That is, the gateway carrier (310) gets the 8YY or telephone numbers routed to it via the PSTN on behalf of the controlled-environment facility communications service provider offering inbound calling to controlled-environment facilities (104). The gateway carrier transports the originating inbound call to the service provider via SIP trunking, where the telephone number or 8YY is translated into a telephone URI (Uniform Resource Identifier) and handed off to the controlled-environment facility communications service provider for further processing and completion to the desired resident.

This service provider receives the SIP call at the secure controlled-environment facility inbound and outbound calling platform (140), at 516, and at 518, the secure controlled-environment facility inbound and outbound calling platform (140) translates the telephone number embedded in the SIP address. First, the secure controlled-environment facility inbound and outbound calling platform translates the telephone number into a specific resident of a controlled-environment facility at 518 and then, if available, a routable IP address of a resident communications device (112) that is, at least at the time, uniquely associated with the resident being called, at 520. These functions at 518 and 520 may employ real-time call processing functions of the SIP application server (302), the resident directory (306) and the consolidated AMS (318) which, in turn, has up-to-date or real-time access to the presence server (308), the location server (320) and the eligible caller database (314). The eligible caller database will be kept up-to-date with respect to available funds in the account of either the caller or the resident paying the charges for the call, once completed.

The secure controlled-environment facility inbound and outbound calling platform (140) verifies the eligibility of the caller to communicate with the resident, at 522, availability of funds for the call, at 524 and calling party status of the resident communications device (112) (based upon presence server (308) and other factors) as "ready-to-receive", at 526. In general, as noted, callers establish an account in advance with the service provider. If it is determined, with respect to the funding platform (218), that the account has insufficient funds at the time an inbound call is attempted, the calling party will be given an immediate ability to add funds via credit card, or the like. A credit card transaction fee may generally be applied. However, when the resident has established their own payment system, a funding account may not be required for an outside party to place an inbound call. To wit, in accordance with some embodiments of the present systems and methods, controlled-environment facility residents may be enabled to lease an 8YY number (e.g., an "800" number) from the service provider.

Once the secure controlled-environment facility inbound and outbound calling platform (140) has verified the eligibility of the caller, at 522, availability of funds for the call, at 524 and calling party status of the resident (based upon presence server (308) and other factors), at 526, the caller will be bridged via the media gateway (304), at 528, for voice notifications based upon requirements of the resident's controlled-environment facility. Such notifications may utilize an IVR (212). In general, these notifications may require the caller to positively respond, via voice or touch pad, at 530, in order to continue through the process of completing the call. Once the caller responds to the notifications, at 530, and hence, when the call is allowed to go through, a VoIP/SIP call (i.e., the "terminating call") will be placed to the controlled-environment facility communication processing system (102) for the facility (104) housing the resident being called at 532. At 534, the controlled-environment facility communication processing system (102) receives the call at its edge router and signals ("rings") the resident communications device (112), generally reaching it through an internal LAN network at 536.

Once answered by the resident at 538, the call (i.e., voice or video communications session) will continue until terminated at 540 by either the outside calling party or the called resident party, or by the secure controlled-environment facility inbound and outbound calling platform due to maximum call timers or other reasons. The call may be audio-monitored or video-monitored in real-time by authorized personnel, such as authorized controlled-environment facility personnel, law enforcement, etc. The call may recorded for future access by such authorized personnel using an online recording and storage system (212). A voice recognition system (210) may be employed during the call or during the set-up stages of the call.

After completion of the call at 540, the service provider's billing system (220) may, at 542, receive a complete record of the call for billing purposes, and such record may also be registered with various reporting systems and operations support systems (222) of the service provider. At 544, the billing system will price out the call and debit the appropriate funding accounts according to normal billing cycles.

FIG. 5 is (also) described above with respect to inbound calling by an "outside" party, such as a non-resident. However, as noted, some embodiments of the present systems and methods may implement resident-to-resident (inmate-to-inmate) calls (i.e., calls between residents of the same controlled-environment facility or different controlled-environment facilities), particularly under various security constraints, consistent with the above descriptions.

FIG. 6 shows example media path 600 for secure inbound calling to controlled-environment facility residents, according to some embodiments. FIG. 6 may be viewed as a high-level diagrammatic illustration for implementing a media path of an end-to-end telephone call originating from a local telephone or cellular subscriber on the PSTN (118) and terminating at a resident communications device (112) within a controlled-environment facility (104) employing the elements described above. This end-to-end media path may be one element related to an inbound call, in accordance with embodiments of the present systems and methods. As used herein "media path" refers to a series of circuits, networks and data links which are bridged together to transmit real-time voice or video communications between two or more parties on a call.

Embodiments of the present systems and methods for inbound phone and video calls to controlled-environment facility resident telephone numbers assigned to controlled-environment facility resident communications devices as described herein, may be implemented or executed, at least in part, by one or more computer systems. One such computer system is illustrated in FIG. 7. In various embodiments, computer system 700 may be a server, a mainframe computer system, a workstation, a network computer, a desktop computer, a laptop, a tablet computing device, media player, or the like. For example, in some cases, computer 700 may implement one or more steps of example process implementations 400 and/or 500 described above, and/or a computer system such as computer system 700 may be used as, or as part of, one or more of controlled environment facility communication processing system 102, resident communications device 112, AMS 136, secure controlled-environment outbound calling platform 138, secure controlled-environment facility inbound and outbound calling platform 140, and/or the like, including components thereof, as described above. In various embodiments two or more of these computer systems may be configured to communicate with each other in any suitable way, such as, for example, via a network, such as may wirelessly communicate with controlled-environment facility communication processing system management system 102.

As illustrated, example computer system 700 includes one or more processors 710 coupled to a system memory 720 via an input/output (I/O) interface 730. Example computer system 700 further includes a network interface 740 coupled to I/O interface 730, and one or more input/output devices 750, such as video device(s) 760 (e.g., a camera), audio device(s) 770 (e.g., a microphone and/or a speaker), and display(s) 780. Computer system 700 may also include a cursor control device (e.g., a mouse or touchpad), a keyboard, etc. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

In various embodiments, computer system 700 may be a single-processor system including one processor 710, or a multi-processor system including two or more processors 710 (e.g., two, four, eight, or another suitable number). Processors 710 may be any processor capable of executing program instructions. For example, in various embodiments, processors 710 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 710 may commonly, but not necessarily, implement the same ISA. Also, in some embodiments, at least one processor 710 may be a graphics processing unit (GPU) or other dedicated graphics-rendering device.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 6, above, may be stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-readable medium may include any tangible or non-transitory storage media or memory media such as magnetic or optical media—e.g., disk or CD/DVD-ROM coupled to computer system 700 via I/O interface 730, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 740.

In some embodiments, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any suitable protocol, timing or other data transformations to convert data signals from one component (e.g., system memory 720) into a format usable by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments, some or all of the functionality of I/O interface 730, such as an interface to system memory 720, may be incorporated into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 7, memory 720 may include program instructions 725, configured to implement certain embodiments described herein, and data storage 735, comprising various data accessible by program instructions 725. In an embodiment, program instructions 725 may include software elements corresponding to one or more of the various embodiments illustrated in the above figures. For example, program instructions 725 may be implemented in various embodiments using any desired programming language, scripting language, or combination of programming languages and/or scripting languages (e.g., C, C++, C #, JAVA®, JAVASCRIPT®, PERL®, etc.). Data storage 735 may include data that may be used in these embodiments. In other embodiments, other or different software elements and data may be included.

A person of ordinary skill in the art will appreciate that computer system 700 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An inbound voice and video call system enabling calls to inmate telephone numbers, the system comprising:
   a plurality of inmate communications devices deployed in at least one correctional facility, each associated with a correctional facility inmate;
   a controlled-environment facility inbound and outbound calling platform configured to:
     assign a telephone number to each correctional facility inmate;

associate a routable address of each resident communications device with the telephone number assigned to a correctional facility inmate associated with the inmate communications device;

identify the inbound caller upon an inbound call being placed to a telephone number assigned to a correctional facility inmate;

determine the inbound caller is eligible to call the inmate assigned the called telephone number;

determine the inmate communications device associated with the inmate assigned the called telephone number is ready to receive the call; and signal the inmate communications device associated with the inmate assigned the called telephone number, following identifying the inbound caller, determining the inbound caller is eligible to call the inmate assigned the called telephone number and determining an inmate communications device associated with the inmate assigned the called telephone number is ready to receive the call; and a correctional facility communication processing system configured to:

route the call to the inmate communications device associated with the inmate assigned the called telephone number;

receive the inbound call from the inbound calling platform; and connect the call to the inmate communications device associated with the inmate assigned the called telephone number.

2. The system of claim 1, wherein:

each of the inmate communications devices further comprises a presence application executing on the respective inmate communications device, the presence application transmitting a presence event package from the respective inmate communications device ready to receive being operated by an inmate ready to receive; and the controlled-environment facility inbound and outbound calling platform comprises a presence server configured to receive the presence event package.

3. The system of claim 1, wherein the controlled-environment facility inbound and outbound calling platform is disposed in a correctional facility communications service provider call processing center serving a plurality of correctional facilities.

4. The system of claim 3, further comprising a consolidated correctional facility administration and management system associated with the controlled-environment facility inbound and outbound calling platform.

5. The system of claim 4, wherein the consolidated correctional facility administration and management system is configured to create and maintain uniform personal identification numbers and a list thereof, each uniform personal identification number assigned to an inmate reachable by the controlled-environment facility inbound and outbound calling platform, regardless of in which correctional facility of the plurality of correctional facilities severed by the controlled-environment facility inbound and outbound calling platform the inmate resides.

6. The system of claim 1, wherein the controlled-environment facility inbound and outbound calling platform comprises a session initiation protocol application server configured to translate the called telephone number to an internet protocol address of the inmate communications device assigned to the inmate to whom the called telephone number is assigned to.

7. The system of claim 1, wherein the controlled-environment facility inbound and outbound calling platform is further configured to:

present an online directory to accessing inbound callers, the online directory listing:

a name of each of one or more inmates that an accessing inbound caller is allowed to call;

the telephone number assigned to each of the one or more inmates the inbound caller is allowed to call; and whether an inmate communications device associated with each of the one or more inmates the inbound caller is allowed to call is ready to receive a call.

8. The system of claim 7, wherein the controlled-environment facility inbound and outbound calling platform is further configured to determine funds are available in an account of the inbound caller for the inbound call and present, via the online directory, whether funds are available in the account of the caller to call inmates listed in the online directory.

9. A method for inbound calling to an inmate telephone number, comprising:

assigning a telephone number to each inmate of a correctional facility;

associating a routable address of each resident communications device deployed within the correctional facility with the telephone number assigned to a correctional facility inmate associated with the inmate communications device;

routing a call made to one of the telephone numbers to a controlled-environment facility inbound and outbound calling platform;

determining, by the controlled-environment facility inbound and outbound calling platform:

identification of the inbound caller;

the inbound caller is eligible to call an inmate assigned the one telephone number; and an inmate communications device associated with the inmate assigned the one telephone number, is ready to receive the call;

signaling the inmate communications device associated with the inmate assigned the one telephone number, following determining identification of the inbound caller, determining the inbound caller is eligible to call the inmate assigned the one telephone number and determining the inmate communications device associated with the inmate assigned the one telephone number is ready to receive the call; and connecting the call to the inmate communications device associated with the inmate assigned the one telephone number.

10. The method of claim 9, further comprising:

executing a presence application on inmate communications devices; and transmitting a presence event package from inmate communications devices ready to receive being operated by an inmate ready to receive.

11. The method of claim 9, further comprising translating the one called telephone number to an internet protocol address of the inmate communications device associated with the inmate assigned the one telephone number.

12. The method of claim 9, further comprising creating and maintaining uniform personal identification numbers and a list thereof, by a consolidated correctional facility administration and management system associated with the controlled-environment facility inbound and outbound calling platform, each uniform personal identification number assigned to an inmate reachable by the controlled-environment facility inbound and outbound calling platform, regardless of in what correctional facility of a plurality of correctional facilities severed by the controlled-environment facility inbound and outbound calling platform the inmate resides.

13. The method of claim 9, further comprising presenting, via an online directory:
inmates that an inbound caller accessing the online directory is allowed to call;
at least one telephone number of at least one inmate the inbound caller is allowed to call; and
whether inmate communications devices the inbound caller is allowed to call are ready to receive a call.

14. The method of claim 13, further comprising determining funds are available in an account of the inbound caller for the call and presenting, via the online directory, whether funds are available in the account of the inbound caller to call inmates listed in the online directory.

15. A non-transitory computer-readable storage medium having program instructions stored thereon that:
upon execution by each of a plurality of inmate communications devices deployed in at least one correctional facility cause each inmate communications device to transmit a presence event package from the respective inmate communications device ready to receive being operated by an inmate ready to receive;
upon execution by a controlled-environment facility inbound and outbound calling platform cause the controlled-environment facility inbound and outbound calling platform to:
identify the inbound caller;
determine the inbound caller is eligible to call an inmate assigned a telephone number called by the inbound caller;
determine the inmate communications device associated with the inmate the called telephone number is assigned to is ready to receive the call; and
signal the inmate communications device the inmate the called telephone number is assigned to, following identifying the inbound caller, determining the inbound caller is eligible to call an inmate assigned the called telephone number and determining the inmate assigned the called telephone number and the inmate communications device associated with inmate the called telephone number is assigned to is ready to receive the call; and
upon execution by the correctional facility communication processing system:
route the call to the inmate communications device associated with the inmate assigned the called telephone number;
receive the inbound call from the inbound calling platform; and
connect the call to the inmate communications device associated with the inmate assigned the called telephone number.

16. The non-transitory computer-readable storage medium of claim 15, wherein the controlled-environment facility inbound and outbound calling platform comprises a presence server and execution of the program instructions by the presence server cause the presence server to receive the presence event package.

17. The non-transitory computer-readable storage medium of claim 15, wherein the controlled-environment facility inbound and outbound calling platform comprises a session initiation protocol application server, and execution of the program instructions by the session initiation protocol application server cause the session initiation protocol application server to translate the called telephone number to an internet protocol address of the inmate communications device associated with the inmate assigned the called telephone number.

18. The non-transitory computer-readable storage medium of claim 15, wherein the controlled-environment facility inbound and outbound calling platform is associated with a consolidated correctional facility administration and management system, and execution of the program instructions by the consolidated correctional facility administration and management system cause the consolidated correctional facility administration and management system to create and maintain uniform personal identification numbers and a list thereof, each uniform personal identification number assigned to an inmate reachable by the controlled-environment facility inbound and outbound calling platform, regardless of in what correctional facility of a plurality of correctional facilities severed by the controlled-environment facility inbound and outbound calling platform the inmate resides.

19. The non-transitory computer-readable storage medium of claim 15, where execution of the program instructions cause the controlled-environment facility inbound and outbound calling platform to present an online directory to accessing inbound callers listing:
inmates that an accessing inbound caller is allowed to call;
at least one telephone number of at least one inmate the accessing inbound caller is allowed to call; and
whether the inmate communications devices the accessing inbound caller is allowed to call are ready to receive a call.

20. The non-transitory computer-readable storage medium of claim 19, where execution of the program instructions cause the controlled-environment facility inbound and outbound calling platform to determine funds are available in an account of the inbound caller for the call and present, via the online directory, whether funds are available in the account of the inbound caller to call inmates listed in the online directory.

* * * * *